(12) United States Patent
Todaka

(10) Patent No.: US 9,811,957 B2
(45) Date of Patent: Nov. 7, 2017

(54) GATE APPARATUS, COMMUNICATION APPARATUS, COMMUNICATION SYSTEM, GATE CONTROL METHOD, AND PROGRAM

(71) Applicant: FELICA NETWORKS, INC., Tokyo (JP)

(72) Inventor: Yuichi Todaka, Kanagawa (JP)

(73) Assignee: FELICA NETWORKS, INC., Tokyo (JP)

( * ) Notice: Subject to any disclaimer, the term of this patent is extended or adjusted under 35 U.S.C. 154(b) by 28 days.

(21) Appl. No.: 14/568,518

(22) Filed: Dec. 12, 2014

(65) Prior Publication Data

US 2015/0179007 A1 Jun. 25, 2015

(30) Foreign Application Priority Data

Dec. 25, 2013 (JP) ................................. 2013-266526

(51) Int. Cl.
*G07C 9/00* (2006.01)
*H04L 9/08* (2006.01)
(Continued)

(52) U.S. Cl.
CPC ...... *G07C 9/00111* (2013.01); *B60R 25/2027* (2013.01); *H04B 5/0062* (2013.01);
(Continued)

(58) Field of Classification Search
CPC ...... G07C 2009/00809; G07C 9/00103; G07C 9/00111; G07C 9/00309; B60R 25/2027; G06F 21/34; G06F 21/35; H04B 13/005; H04B 7/26; H04B 5/0062; H04L 2209/805; H04L 2209/88; H04L 63/0853;
(Continued)

(56) References Cited

U.S. PATENT DOCUMENTS 6,223,018 B1 * 4/2001 Fukumoto ................ H04B 5/00
379/55.1
7,612,651 B2 * 11/2009 Ishibashi ............. G07C 9/00111
340/5.2

(Continued)

*Primary Examiner* — Dionne H Pendleton
(74) *Attorney, Agent, or Firm* — Chip Law Group

(57) ABSTRACT

Provided is a gate apparatus including a sensor that detects a pedestrian; multiple human body communication electrodes for performing human body communication; and a control unit that determines a position of the pedestrian according to information on the pedestrian detected by the sensor, performs outputting of a connection confirmation request packet through a human body communication electrode corresponding to the determined position, receives a connection confirmation response packet transmitted from a human body communication terminal and performs analysis processing on the received connection confirmation response packet, and performs opening and closing control of a gate opening and closing unit, in which the control unit stores in the connection confirmation request packet an output electrode identifier of a communication electrode that performs packet outputting, and determines whether or not the output electrode identifier and an electrode identifier of the electrode that receives the connection confirmation response packet agree with each other.

14 Claims, 20 Drawing Sheets

(51) Int. Cl.
*H04B 13/00* (2006.01)
*H04B 7/26* (2006.01)
*B60R 25/20* (2013.01)
*H04B 5/00* (2006.01)

(52) U.S. Cl.
CPC ............. *H04B 7/26* (2013.01); *H04B 13/005* (2013.01); *H04L 9/0827* (2013.01); *G07C 2009/00809* (2013.01)

(58) Field of Classification Search
CPC ....... H04L 63/0861; H04L 63/18; H04L 9/08; H04L 9/3215; H04L 9/0827; H04W 12/06; H04W 76/02
See application file for complete search history.

(56) References Cited

U.S. PATENT DOCUMENTS

| | | | |
|---|---|---|---|
| 7,922,084 B2* | 4/2011 | Ishibashi ............ | G07C 9/00103 235/375 |
| 2015/0162994 A1* | 6/2015 | Rodzevski ......... | G07C 9/00309 455/39 |
| 2015/0318933 A1* | 11/2015 | Washiro ............... | H04B 5/0012 455/41.1 |

* cited by examiner

GATE APPARATUS, COMMUNICATION APPARATUS, COMMUNICATION SYSTEM, GATE CONTROL METHOD, AND PROGRAM

CROSS REFERENCE TO RELATED APPLICATIONS

This application claims the benefit of Japanese Priority Patent Application JP 2013-266526 filed Dec. 25, 2013, the entire contents of which are incorporated herein by reference.

BACKGROUND

The present disclosure relates to a gate apparatus, a communication apparatus, a communication system, a gate control method, and a program, and more particularly to a gate apparatus, a communication apparatus, a communication system, a gate control method, and a program for identifying a person who carries a communication terminal by performing communication with the communication terminal that the person owns, and thus performing control such as opening and closing of a gate.

Most current automatic ticket examining systems include a reader/writer capable of performing proximity wireless communication in a ticket examining machine. When an IC card, a mobile terminal, or the like that a person owns comes into contact with or approaches the reader/writer, communication is performed between the reader/writer and the IC card or the mobile terminal and thus necessary processing, such as authentication processing or fare adjustment, is performed. Control is performed such as opening a gate under the condition that completion of these processing tasks has been confirmed.

In the system using the reader/writer, a user who is going to go through a ticket examination has to take out the IC card or the mobile terminal that he/she owns and to cause the IC card or the mobile terminal to be brought into proximity to the reader/writer. However, for example, in a case where the user carries many items of baggage, the user may have difficulty taking out the IC card or the mobile terminal and causing the IC card or the mobile terminal to be brought into proximity to the reader/writer. Furthermore, an older person who uses a cane or a wheelchair user may also have difficulty taking out the IC card or the mobile terminal and causing the IC card or the mobile terminal to be brought into proximity to the reader/writer. Additionally, in most cases, such a person as one with poor eyesight may have difficulty determining a position of the reader/writer clearly.

A gate apparatus in the related art in which the IC card or the mobile terminal that does not have to be brought proximity to the reader/writer is disclosed, for example, in Japanese Unexamined Patent Application Publication Nos. 2012-190371 and 2012-194720.

Disclosed in Japanese Unexamined Patent Application Publication Nos. 2012-190371 and 2012-194720 is a system in which communication between a communication unit of a gate apparatus and a communication terminal that the user owns is performed as human body communication through a human body and thus the communication between the communication unit of the gate apparatus and the communication terminal is possible without the user taking out the IC card or the communication terminal.

Moreover, the human body communication is a communication technology by which the communication is performed with a human body serving as a communication medium, and is disclosed, for example, in Japanese Unexamined Patent Application Publication No. 2006-324774 and the like.

However, the system that uses the human body communication has such a problem as one in which when pedestrians enter the gate apparatus in succession, the pedestrians in succession are difficult to identify.

In the human body communication, communication data is transferred even between different approaching human bodies. For this reason, even when a preceding pedestrian does not carry a communication terminal, communication with a communication terminal that a following pedestrian carries is performed through the human body of the following pedestrian from the human body of the preceding pedestrian. As a result, for example, even though it is difficult to distinguish between the preceding pedestrian and the following pedestrian who pass through the gate and the preceding pedestrian does not carry a communication terminal, there is a likelihood that erroneous processing will be performed such as one in which the preceding pedestrian is allowed to pass through the gate due to the communication with the communication terminal that the following pedestrian carries.

SUMMARY

It is desirable to provide a gate apparatus, a communication apparatus, a communication system, a gate control method, and a program for identifying a person who carries a human body communication terminal with high accuracy in a system that performs communication through a human body.

According to an embodiment of the present disclosure, there is provided a gate apparatus including: a sensor that detects a pedestrian within a gate; multiple human body communication electrodes that are electrodes for performing human body communication and that are separated from one another within the gate; and a control unit that determines a position of the pedestrian according to information on the pedestrian that is detected by the sensor, performs outputting of a connection confirmation request packet through a human body communication electrode corresponding to the determined position, receives a connection confirmation response packet that is transmitted from a human body communication terminal that the pedestrian carries and thus performs analysis processing on the received connection confirmation response packet, and performs opening and closing control of a gate opening and closing unit based on a result of the analysis result, in which the control unit stores in the connection confirmation request packet an output electrode identifier that is an identifier of a communication electrode that performs packet outputting, and determines whether or not the output electrode identifier and an electrode identifier of the electrode that receives the connection confirmation response packet agree with each other.

Additionally, in the gate apparatus according to the embodiment of the present disclosure, in a case where it is determined that the output electrode identifier and the electrode identifier of the electrode that receives the connection confirmation response packet agree with each other, the control unit may perform authentication processing necessary to open the gate opening and closing unit.

Additionally, in the gate apparatus according to the embodiment of the present disclosure, a human body communication terminal that receives the connection confirmation request packet may store the output electrode identifier stored in the connection confirmation request packet in the connection confirmation response packet for transmission, and the control unit may determine whether or not the output electrode identifier stored in the connection confirmation response packet and the electrode identifier of the electrode that receives the connection confirmation response packet agree with each other, and in a case where it is determined that the two electrode identifiers agree with each other and where the authentication process succeeds, the control unit may open the gate opening and closing unit.

Additionally, in the gate apparatus according to the embodiment of present disclosure, in a case where the multiple electrodes that receive the connection confirmation response packet are present, the control unit may select the electrode that has a high reception level, as a receiving electrode, determines whether or not the electrode identifier of the selected electrode that receives the packet and the output electrode identifier agree with each other, and in a case where it is determined that the two electrode identifiers agree with each other, and where the authentication process succeeds, the control unit may open the gate opening and closing unit.

Additionally, in the gate apparatus according to the embodiment of the present disclosure, the control unit may store in a storage unit pedestrian-position information in which the pedestrian and positional information on the pedestrian are associated with each other, and in a case where the output electrode identifier stored in the connection confirmation response packet and the electrode identifier of the electrode that receives the connection confirmation response packet do not agree with each other, referring to the pedestrian-position information stored in the storage unit, the control unit may determine whether or not due to movement of the pedestrian, the two electrode identifiers do not agree with each other.

Additionally, in the gate apparatus according to the embodiment of the present disclosure, the control unit may estimate a moving speed of the pedestrian, based on the information on the pedestrian that is detected by the sensor, and in a case where the moving speed is equal to or higher than a threshold that is prescribed in advance and the electrode that receives the connection confirmation response packet is farther, in a direction of passing through the gate, from an entrance of the gate than an electrode position indicating the output electrode identifier, without the output electrode identifier stored in the connection confirmation response packet and the electrode identifier of the electrode that receives the connection confirmation response packet agreeing with each other, the control unit may determine that due to movement of the pedestrian, the two electrode identifiers do not agree with each other.

Additionally, in the gate apparatus according to the embodiment of the present disclosure, a human body detection sensor may be configured to be placed in parallel with each of the multiple human body communication electrodes, and the control unit may determine a position of the pedestrian based on the information on the pedestrian that is detected by the human body detection sensor that is placed in parallel with the human body communication electrode, and may select the human body communication electrode corresponding to the determined position of the pedestrian, as the electrode that outputs the connection confirmation request packet.

Additionally, the gate apparatus according to the embodiment of the present disclosure may further include a wireless communication unit, the gate apparatus performing processing that communicates with a wireless communication terminal by applying information obtained by human body communication with the human body communication terminal, and thus may perform processing necessary for passing through the gate apparatus.

Additionally, according to a second embodiment of the embodiment of the present disclosure, there is provided a communication apparatus including: a human body communication unit that performs communication through a human body; and a control unit that performs generation of a packet that is transmitted through the human body communication unit and performs analysis of the packet that is received through human body communication unit, in which the control unit obtains an output electrode identifier that is an identifier stored in a connection confirmation request packet that is received from a gate apparatus, and that indicates the electrode that outputs the connection confirmation request packet, and generates a connection confirmation request packet in which the obtained output electrode identifier and a terminal identifier that is an identifier of the communication apparatus itself are stored, and outputs the generated connection confirmation response packet through the human body communication unit.

Additionally, the communication apparatus according to the embodiment of the present disclosure may further include a wireless communication unit that performs wireless communication with a portable communication terminal, in which the control unit may store communication information necessary for communication with the portable communication terminal in the connection confirmation response packet, and transmits the stored communication information to the gate apparatus.

Additionally, according to a third embodiment of the embodiment of the present disclosure, there is provided a communication system including: a gate apparatus; and a human body communication terminal, in which the gate apparatus may include; a sensor that detects a pedestrian within a gate; multiple human body communication electrodes that are electrodes for performing human body communication and that are separated from one another within the gate; and a gate-apparatus control unit that determines a position of the pedestrian according to information on the pedestrian that is detected by the sensor, performs outputting of a connection confirmation request packet through a human body communication electrode corresponding to the determined position, receives a connection confirmation response packet that is transmitted from a human body communication terminal that the pedestrian carries and thus performs analysis processing on the received connection confirmation response packet, and performs opening and closing control of a gate opening and closing unit based on a result of the analysis result, in which the gate-apparatus control unit may be configured to store in the connection confirmation request packet an output electrode identifier that is an identifier of a communication electrode that performs packet outputting, and to determine whether or not the output electrode identifier and an electrode identifier of the electrode that receives the connection confirmation response packet agree with each other, and in which the human body communication terminal may include; a human body communication unit that performs communication through a human body; and a terminal control unit that performs generation of a packet that is transmitted through the human body communication unit and performs analysis of the packet that is received through human body communication unit, and in which the terminal control unit may obtain the output electrode identifier stored in a connection confirmation request packet that is received from the gate apparatus, may generate a connection confirmation response packet in which the obtained output electrode identifier and a terminal identifier that is an identifier of the communication apparatus itself are stored, and may output the generated connection confirmation response packet through the human body communication unit to the gate apparatus.

Additionally, according to a fourth embodiment of the present disclosure, there is provided a gate control method that is performed in a gate apparatus that includes a sensor that detects a pedestrian within a gate and multiple human body communication electrodes that are electrodes for performing human body communication and that are separated from one another within the gate, the method causing a control unit to perform; determining a position of the pedestrian according to information on the pedestrian that is detected by the sensor; determining a human body communication electrode corresponding to the determined position, as the electrode that outputs a packet; generating a connection confirmation request packet in which an output electrode identifier that is an identifier of the determined electrode that outputs the packet is stored and outputting the generated connection confirmation request packet from the determined electrode that outputs the packet; and receiving a connection confirmation response packet that is transmitted from a human body communication terminal that a gate-passing pedestrian carries and determining whether or not an electrode identifier of the electrode that outputs the packet and an electrode identifier of the electrode that receives the connection confirmation response packet agree with each other.

Additionally, according to a fifth embodiment of the present disclosure, there is provided a program for causing gate control processing in a gate apparatus that includes a sensor that detects a pedestrian within a gate and multiple human body communication electrodes that are electrodes for performing human body communication and that are separated from one another within the gate, the program causing a control unit to perform; determining a position of the pedestrian according to information on the pedestrian that is detected by the sensor; determining a human body communication electrode corresponding to the determined position, as the electrode that outputs a packet; generating a connection confirmation request packet in which an output electrode identifier that is an identifier of the determined electrode that outputs the packet is stored and outputting the generated connection confirmation request packet from the determined electrode that outputs the packet; and receiving a connection confirmation response packet that is transmitted from a human body communication terminal that a gate-passing pedestrian carries and determining whether or not an electrode identifier of the electrode that outputs the packet and an electrode identifier of the electrode that receives the connection confirmation response packet agree with each other.

Moreover, the program according to the present disclosure is a program that can be provided, for example, using a storage medium or a communication medium that is provided in a computer-readable format to an information processing apparatus or a computer/system that is capable of executing a variety of programs/codes. By providing such a program in the computer-readable format, the processing according to the program on the information processing apparatus or the computer/system is executed.

Other objects, features, and advantages according to the present disclosure are apparent from embodiments according to the present disclosure, which are described below, or from a more detailed description that is based on the accompanying drawings according to the present disclosure.

Moreover, the system in the present specification is configured to be a logical combination of multiple apparatuses, and the apparatuses in each configuration are not limited to being within the same housing.

With the configuration according to one embodiment of the present disclosure, with regard to the gate apparatus that performs gate control by the human body communication, the apparatus and the method for identifying the pedestrian individually are realized.

Specifically, the position of the pedestrian is determined according to sensor-obtained information that contains a result of detecting the gate-passing pedestrian. The connection confirmation request packet that is output through the human body communication electrode corresponding to the determined position. The connection confirmation response packet that is transmitted from the human body communication terminal that the pedestrian carries is received and analysis processing is performed on the received connection confirmation response packet.

The processing for the opening and closing control of the gate opening and closing unit is performed based on a result of the analysis processing. The control unit stores the output electrode identifier of the electrode that outputs the packet, in the connection confirmation request packet, and determines whether or not the output electrode identifier and the electrode identifier of the electrode that receives the connection confirmation response packet agree with each other, and performs the authentication processing for opening the gate in a case where the two electrode identifiers agree with each other.

With the present configuration, with regard to the gate apparatus that performs gate control by the human body communication, the apparatus and the method for identifying the pedestrian individually are realized.

Moreover, effects described in the present specification are for illustration and thus are not limited to this illustration, and additional effects may be present.

BRIEF DESCRIPTION OF THE DRAWINGS

FIG. 11 is a diagram for describing a position that a human body detection sensor is set to be in;

FIG. 13 is a diagram for describing measures that are taken to deal with a case where a gate-passing pedestrian runs, and the like;

FIG. 14 is a diagram illustrating a flowchart for describing a sequence of processing that is performed to deal with the case where the gate-passing pedestrian run, and the like;

FIG. 15 is a diagram illustrating a flowchart for describing a sequence of processing that is performed to deal with the case where the gate-passing pedestrian run, and the like;

DETAILED DESCRIPTION OF EMBODIMENTS

Figure 1:
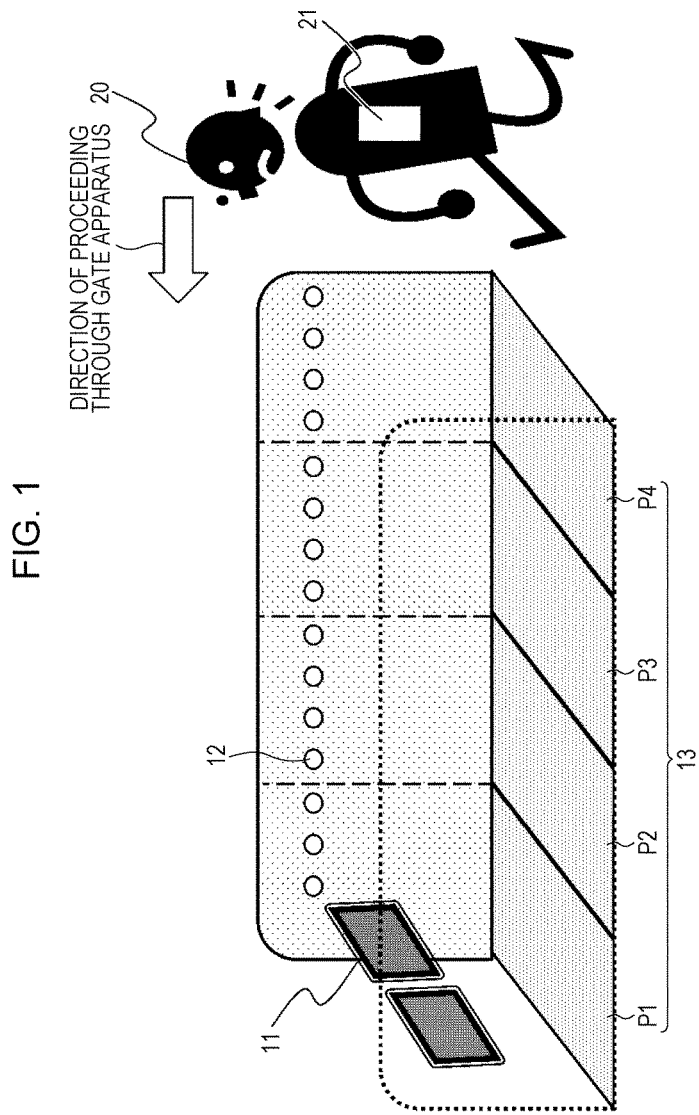
FIG. 1 is a diagram illustrating one configuration example of a gate apparatus that uses human body communication.

A gate apparatus, a communication apparatus, a communication system, and a gate control method, and a program according to the present disclosure are described in detail below referring to the drawings.

Moreover, description is provided under the following headings.
1. Outline of and Problems with the Gate Apparatus that Uses Human Body Communication
2. Embodiment that Enables Individual Identification of Pedestrians
3. Configuration Example of Communication Packet
4. Configuration Example of the Gate Apparatus, and a Human Body Communication Terminal.
4-1. Configuration of the Gate Apparatus
4-2. Configuration of the Human Body Communication Terminal
5. A Gate Opening and Closing Control Sequence in the Human Body Communication
6. Specific Examples and Modification Examples of Each Component of and Processing by the Gate Apparatus
6-1. Setting Example of a Width of the Human Body Communication Electrode
6-2. Relative Position of the Human Body Communication Electrode and the Human Body Detection Sensor
6-3. Processing in a Case where a Human Body Straddles the Multiple Human Body Communication Electrodes
6-4. Associating of a Pedestrian with the Human Body Communication Terminal by the Gate Apparatus
6-5. Process in a Case where the Multiple Pedestrians Pass through a Ticket Gate
7. Modification Examples
8. Summary of Configurations according to the Present disclosure 1. Outline of and Problems with the Gate Apparatus that Uses Human Body Communication First, referring to FIG. 1 and subsequent figures, an outline of a gate apparatus that uses human body communication and problems with the gate apparatus are described.

FIG. 1 is a diagram illustrating one configuration example of the gate apparatus that uses the human body communication. Moreover, the gate apparatus, for example, is used in a ticket gate in a station.

The gate apparatus performs communication with a communication terminal that a gate-passing pedestrian carries, performs predetermined processing, for example, such as validity confirmation of the communication terminal or fare calculation, and opens a gate opening and closing unit 11 to allow the gate-passing pedestrian to pass through, based on a result of confirming that the processing is completed. On the other hand, in a case where the processing such as the validity confirmation of the communication terminal or the fare calculation is not completed, the gate opening and closing unit 11 is in a closed state without being opened thereby prohibiting the gate-passing pedestrian from passing through.

In the gate apparatus that uses the human body communication, the communication is performed between a communication unit within the gate apparatus and a human body communication terminal that the gate-passing pedestrian carries, through a human body of the pedestrian.

The human body communication is communication processing through an electric field around the human body. A specific technique of the human body communication is disclosed in Japanese Unexamined Patent Application Publication No. 2006-324774 that was earlier filed by the applicant. The human body communication in the present application is also performed, for example, by applying the disclosed technology.

The gate apparatus illustrated in FIG. 1 has the gate opening and closing unit 11, a human body detection sensor 12, and human body communication electrodes P1 to P4 (human body communication electrode group 13).

A terminal-carrying pedestrian 20 who is going to pass through the gate apparatus carries a human body communication terminal 21. For example, the human body communication terminal 21 is placed in a pocket of a suit of clothes, a bag, or the like.

Moreover, in the human body communication, communication data can propagate not only through the human body, but also through space around the human body. In a case where the human body communication terminal 21 is placed in a bag, the communication is also possible.

The human body detection sensor 12 of the gate apparatus, for example, is an optical sensor, and identifies a position of the terminal-carrying pedestrian 20 within the gate. When the human body detection sensor 12 identifies the position of the terminal-carrying pedestrian 20, a transmission packet is output from any one among the human body communication electrodes P1 to P4 (human body communication electrode group 13).

The human body communication electrodes P1 to P4 (human body communication electrode group 13), illustrated in the drawings, are positioned in four areas, respectively, and are configured in such a manner that they individually transmit and receive packets. For example, when the human body detection sensor 12 detects that the terminal-carrying pedestrian 20 is on the electrode P4, the transmission packet is output from the electrode P4.

The transmission packet is transferred over the human body of the terminal-carrying pedestrian 20 that serves as a communication medium, and is received by the human body communication terminal 21.

Thereafter, a response packet is transmitted from the human body communication terminal 21, any one among the human body communication electrodes P1 to P4 receives the response packet, and authentication processing, billing processing, or the like, which is data processing performed by the gate apparatus, is performed in a control unit. In a case where the processing succeeds, the gate opening and closing unit 11 is opened to allow the terminal-carrying pedestrian 20 to pass through.

However, for example, in a case where the pedestrian who is going to pass through the gate apparatus does not carry the communication terminal, or in a case where the authentication processing fails or the billing processing is difficult to perform, the control unit maintains a closed state of the gate opening and closing unit 11 and prohibits the pedestrian from passing through the gate.

However, as described above, because the communication through the electric field around the human body is performed in the human body communication, there is a case where a correspondence relationship between the pedestrian and the human body communication terminal that the pedestrian carries is not determined in a state where there is a crowd of pedestrians. This problem is described referring to FIG. 2.

Figure 2:
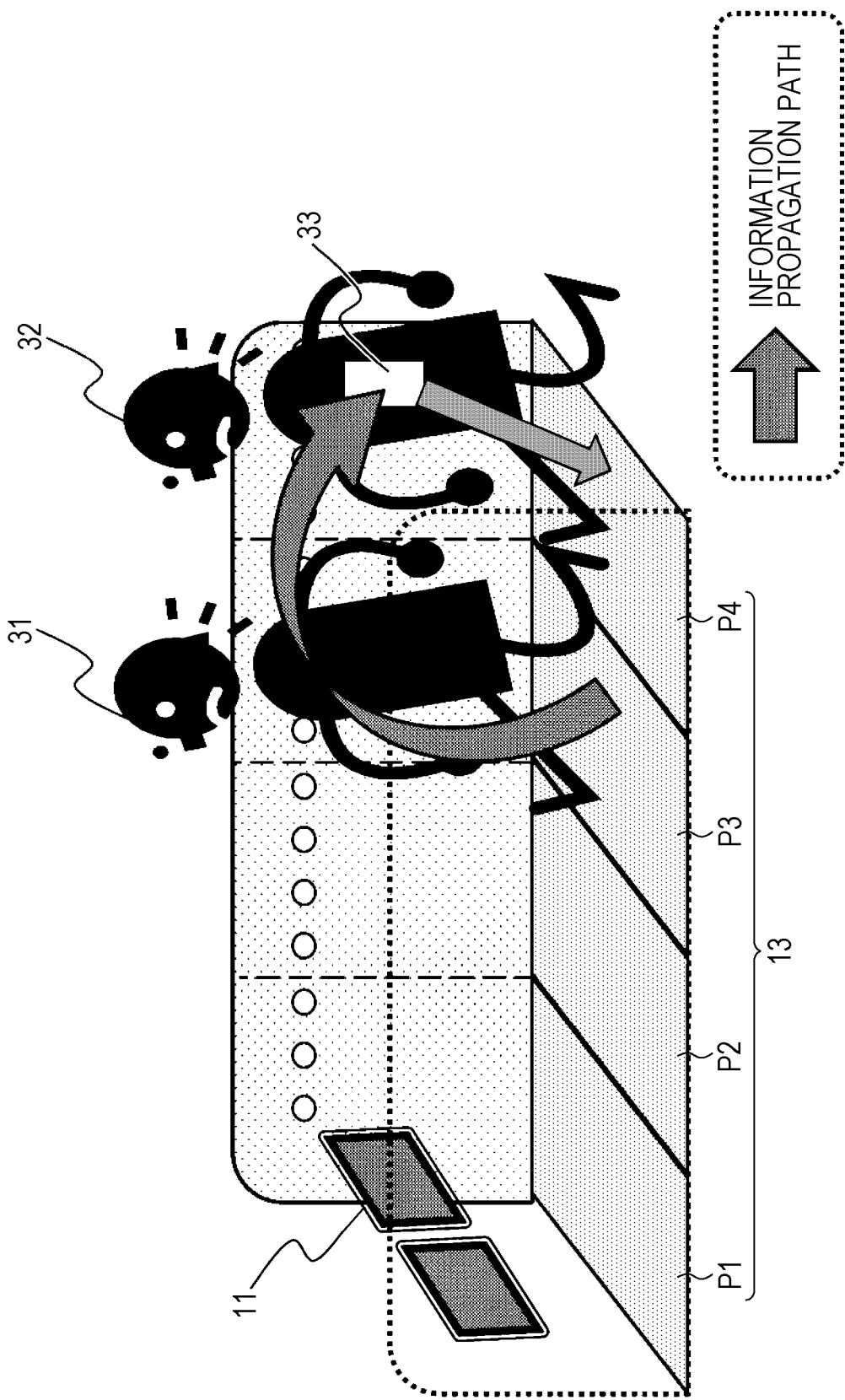
FIG. 2 is a diagram for describing problems with the gate apparatus that uses the human body communication.

An example in FIG. 2 illustrates a state where the pedestrians enter the gate apparatus in succession. A preceding pedestrian is a non-terminal-carrying pedestrian 31 who does not carry the communication terminal, and the following pedestrian is a terminal-carrying pedestrian 32 who carries a human body communication terminal 33.

In a case where in this manner, the non-terminal-carrying pedestrian 31 and the terminal-carrying pedestrian 32 enter the gate apparatus in succession, when the human body communication is performed, it may be erroneously determined that the human body communication terminal 33 that is carried by the following pedestrian (terminal-carrying pedestrian 32) is carried by the preceding pedestrian (the non-terminal-carrying pedestrian 31), thereby the gate opening and closing unit 11 being opened.

This is because the human body communication is performed through the electric field around the human body and thus the communication data propagates through space between the pedestrians in a case where the pedestrian approaches. In this manner, as a result of the communication data propagating through the multiple pedestrians, for example, it is determined that the two pedestrians are one pedestrian and the non-terminal-carrying pedestrian 31 and the terminal-carrying pedestrian 32 is difficult to distinguish between.

In the example illustrated in FIG. 2, the transmission packet that is transmitted from the electrode P3 is transferred through the human body of the non-terminal-carrying pedestrian 31 who is the preceding pedestrian, then propagates from the human body of the non-terminal-carrying pedestrian 31 to the human body of the terminal-carrying pedestrian 32, and is received by the human body communication terminal 33 that the terminal-carrying pedestrian 32 carries.

Thereafter, the response packet that is transmitted from the human body communication terminal 33 is received by the electrode P4 through the human body of the terminal-carrying pedestrian 32. With the received response packet, the control unit (data processing unit) of the gate apparatus performs the authentication processing, the billing processing, or the like.

In this sequence of processing, the processing is performed such that two gate-passing pedestrians are regarded as one gate-passing pedestrian without distinguishing between the non-terminal-carrying pedestrian 31 and the terminal-carrying pedestrian 32.

2. Embodiment that Enables Individual Identification of Pedestrians

Next, an embodiment is described that enables individual identification of each pedestrian even in a case where the multiple pedestrians enter the gate apparatus in succession. The present embodiment is described referring to FIG. 3 and subsequent figures.

Figure 3:
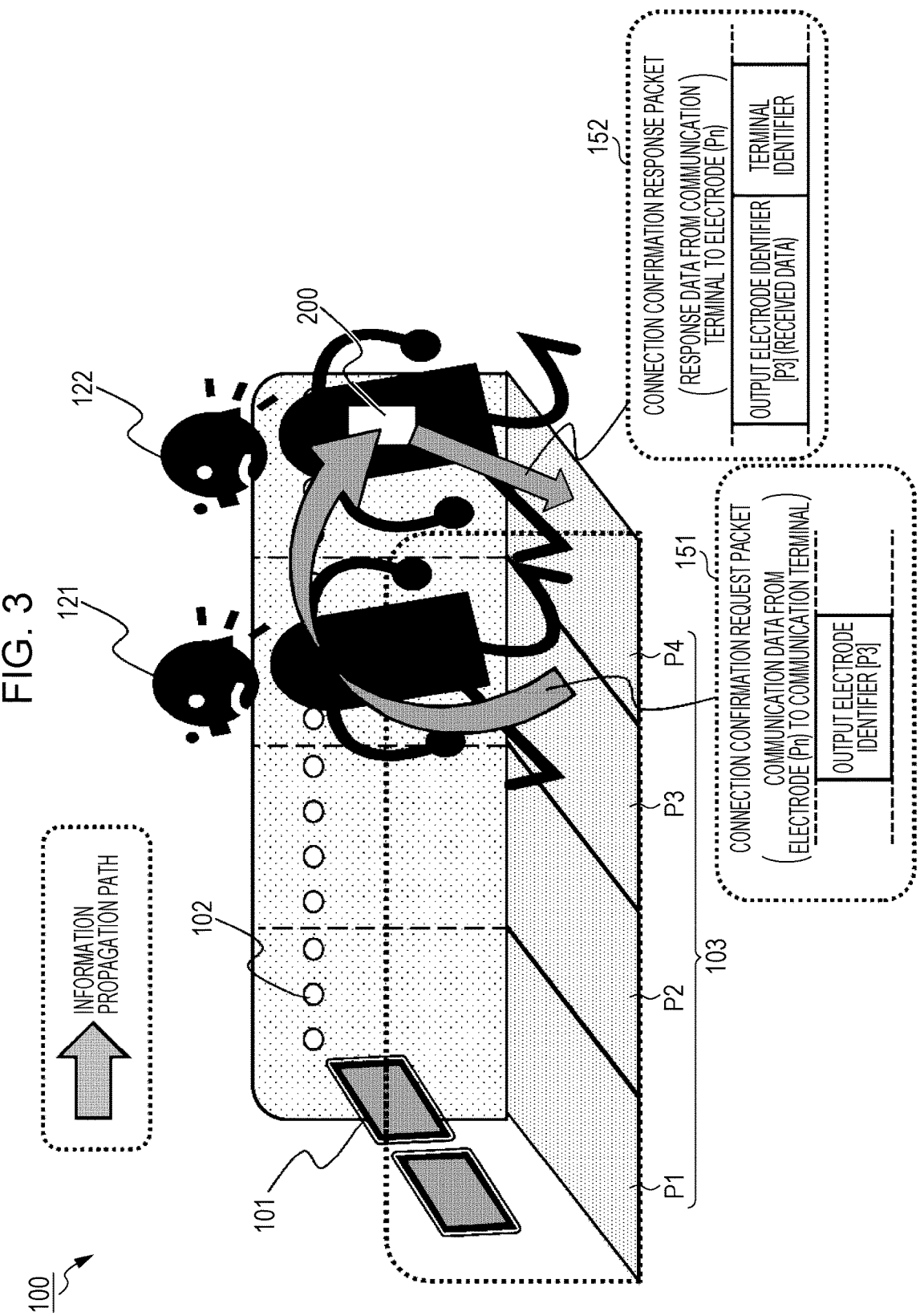
FIG. 3 is a diagram illustrating one configuration example of the gate apparatus that realizes individual identification of pedestrians that pass through a gate.

Like the gate apparatus described above referring to FIGS. 1 and 2, a gate apparatus 100 that is illustrated in FIG. 3 has a gate opening and closing unit 101, a human body detection sensor 102, and a human body communication electrode group 103. The human body communication electrode group 103 is divided with respect to the direction of proceeding through the gate apparatus. In examples illustrated in the drawing, the human body communication electrode group 103 is divided into four electrodes P1 to P4.

FIG. 3 illustrates a state in which the multiple pedestrians enter the gate apparatus 100 in succession, in the same manner as in the above-described example in FIG. 2. The preceding pedestrian is the non-terminal-carrying pedestrian 121 who does not carry the communication terminal, and the following pedestrian is the terminal-carrying pedestrian 122 who carries the human body communication terminal 200.

A configuration of and processing by the gate apparatus 100 is described. The human body detection sensor 102, for example, is an optical sensor, and identifies the position of the gate-passing pedestrian within the gate. When the human body detection sensor 102 identifies a position of the gate-passing pedestrian, the transmission packet is output from any one among the human body communication electrodes P1 to P4 (human body communication electrode group 103).

The human body communication electrode group 103, as illustrated in the drawings, is divided into four electrodes P1 to P4, and the electrodes P1 to P4 can individually transmit and receive a packet.

The human body detection sensor 102 has such a setting that multiple sensors are placed in parallel with positions that correspond to the electrodes P1 to P4. Based on a sensor position of a sensor that outputs detection information on the pedestrian, the control unit can determine which electrode position (of P1 to P4) the pedestrian is at.

For example, when, with the detection information from the human body detection sensor 102, the control unit determines that the gate-passing pedestrian is on the electrode P4, the control unit outputs the transmission packet (connection confirmation request packet) from the electrode P4.

The transmission packet is transferred over the human body of the gate-passing pedestrian that serves as the communication medium, and in a case where the gate-passing pedestrian has the human body communication terminal, the transmission packet is received by the human body communication terminal.

The human body communication terminal that receives the transmission packet (connection confirmation request packet) from a certain one electrode transmits the response packet (connection confirmation response packet) and the response packet is received by any one among the human body communication electrodes P1 to P4. Based on the received packet, the control unit of the gate apparatus 100 performs the authentication processing, the billing processing, or the like. In a case where the processing succeeds, under the control of the control unit, the gate opening and closing unit 101 is set to be in an opened state, and the gate-passing pedestrian is allowed to pass through.

However, in the case where the gate-passing pedestrian who is going to pass through the gate apparatus does not carry the communication terminal, or in the case where the authentication processing fails, the billing processing is difficult to perform, or the like, the control unit maintains the closed state of the gate opening and closing unit 101 and prohibits the pedestrian from passing through the gate. The flow of the processing is basically the same as the processing described above referring to FIG. 2.

However, also in the case where the multiple pedestrians enter the gate apparatus in succession, the gate apparatus 100 according to the present embodiment is capable of performing the processing that individually identifies each pedestrian.

Processing that is performed by the gate apparatus 100 according to the present embodiment is described below. The gate apparatus 100 according to the present embodiment performs the processing in the following sequence.

Step S1

A current position of the preceding pedestrian who enters the gate apparatus 100 is detected in the human body detection sensor 102.

Step S2

The human body communication that uses the human body communication electrode at a position corresponding to a detection position of the pedestrian is performed, and thus a connection to the human body communication terminal that the pedestrian carries is established. In the example illustrated in the drawings, a "connection confirmation request packet 151" is output from the electrode P3.

According to the present embodiment, as illustrated in the drawings, the gate apparatus 100 stores an electrode identifier of the packet output electrode in the "the connection confirmation request packet 151" and then outputs the stored electrode identifier.

In the examples illustrated in the drawings, because the packet output electrode is the electrode P3, an output electrode identifier P3 is stored in the "connection confirmation request packet 151" and then the stored output electrode identifier P3 is output.

Step S3

The "connection confirmation request packet 151" in which the output electrode identifier P3 is stored is received by a human body communication terminal 200 that the terminal-carrying pedestrian 122 carries, through the human bodies of the non-terminal-carrying pedestrian 121 and the terminal-carrying pedestrian 122, which are illustrated in FIG. 3.

Step S4

The human body communication terminal 200 that receives the "connection confirmation request packet 151" in which the output electrode identifier P3 is stored, as illustrated in FIG. 3, generates and outputs the output electrode identifier P3 stored in the received packet and a "connection confirmation response packet 152" in which a terminal identifier that is an identifier of the human body communication terminal 200 itself is stored.

Step S5

The "connection confirmation response packet 152" in which the output electrode identifier P3 and the terminal identifier are stored is transferred to the human body communication electrode group 103 of the gate apparatus 100 over a shortest route through the human body. In the example illustrated in FIG. 3, since the electrode on the shortest route from the human body communication terminal 200 through the human body is the electrode P4, the "connection confirmation response packet 152" is received through the electrode P4.

Step S6

The control unit of the gate apparatus 100 determines whether or not the output electrode identifier that is stored in the "connection confirmation response packet 152" and an identifier of the electrode that receives the "connection confirmation response packet 152" agree with each other. In a case where it is determined that the output electrode identifier and the identifier of the electrode agree with each other, processing thereafter, for example, the authentication processing such as the validity confirmation of the human body communication terminal, the billing processing, or the like, is performed. After the processing is completed, the gate opening and closing unit 101 is opened.

On the other hand, in a case where the output electrode identifier and the identifier of the electrode do not agree with each other, neither the processing thereafter, of the authentication processing such as the validity confirmation of the human body communication terminal, the billing processing, or the like, nor opening processing of the gate opening and closing unit 101 is performed.

In this manner, the gate apparatus 100 according to the present disclosure opens the gate opening and closing unit 101 under the condition that the electrode that transmits the packet and the electrode that receives the packet agree with each other.

That is, under the condition that the electrode that transmits the connection confirmation request packet and the electrode that receives the connection confirmation response packet should agree with each other, the gate opening and closing unit is opened. In a case where the electrode that transmits the connection confirmation request packet and the electrode that receives the connection confirmation response packet do not agree with each other, the gate opening and closing unit is not opened.

Moreover, because the human body communication is performed through the electric field around the human body, in the example illustrated in FIG. 3, "there is a likelihood that connection confirmation response packet 152" will be received not only in the electrode P4, but also in the electrode P3.

In a case where in this manner, it is confirmed that the packet is received in the multiple electrodes, it is determined that the electrode that has a high reception level is the electrode that receives the packet.

A communication path from the human body communication terminal 200 to the electrode P3 is longer than that from the human body communication terminal 200 to the electrode P4, and a space portion that is not the human body, of the propagation path from the human body communication terminal 200 to the electrode P3 is larger than that of the propagation path from the human body communication terminal 200 to the electrode P4. Because air is a material with a lower dielectric constant than the human body, when the propagation path has much space, electric field intensity corresponding to the communication data is low.

In the example illustrated in FIG. 3, from these facts, the control unit (the data processing unit) of the gate apparatus 100 determines that the electric field intensity of the connection confirmation response packet 152 that is received in the electrode P3 is lower than the electric field intensity of the packet that is received in the electrode P4 and therefore that the electrode P4 is the electrode that receives the connection confirmation response packet 152.

In the example illustrated in FIG. 3, the output electrode identifier that is stored in the "connection confirmation response packet 152" is P3, and the identifier of the electrode that receives the "connection confirmation response packet 152" is P4. The control unit of the gate apparatus 100 determines whether or not these two electrodes agree with each other.

In the example illustrated in FIG. 3, it is determined that the two electrode identifiers do not agree with each other, and neither the authentication processing such as the validity confirmation of the human body communication terminal, the billing processing, or the like, nor the opening processing of the gate opening and closing unit 101 is performed. As a result, the non-terminal-carrying pedestrian 121 is prohibited from passing through the gate apparatus.

Figure 4:
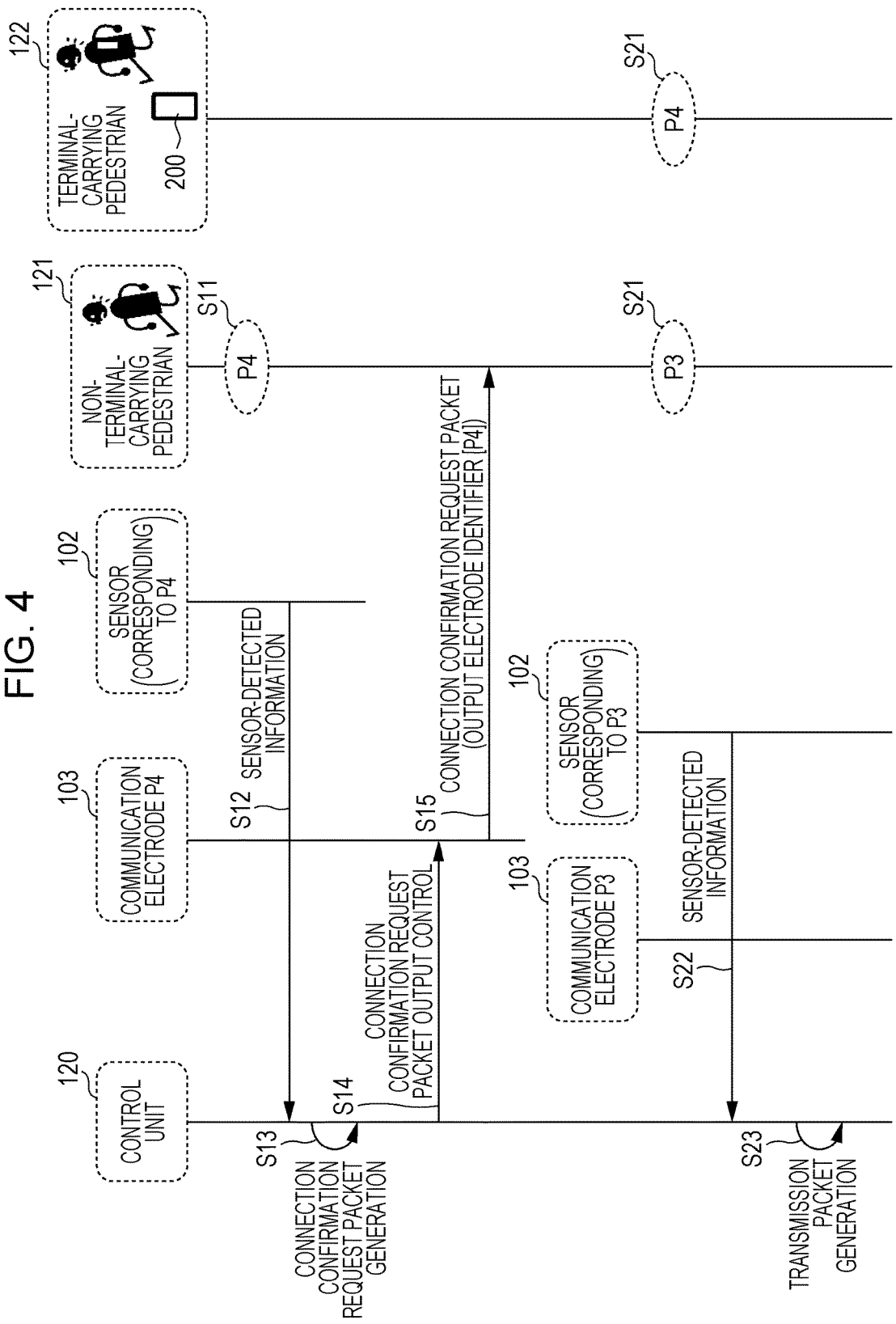
FIG. 4 is a diagram for describing a processing sequence in a case where the pedestrian enters the gate apparatus.
Figure 5:
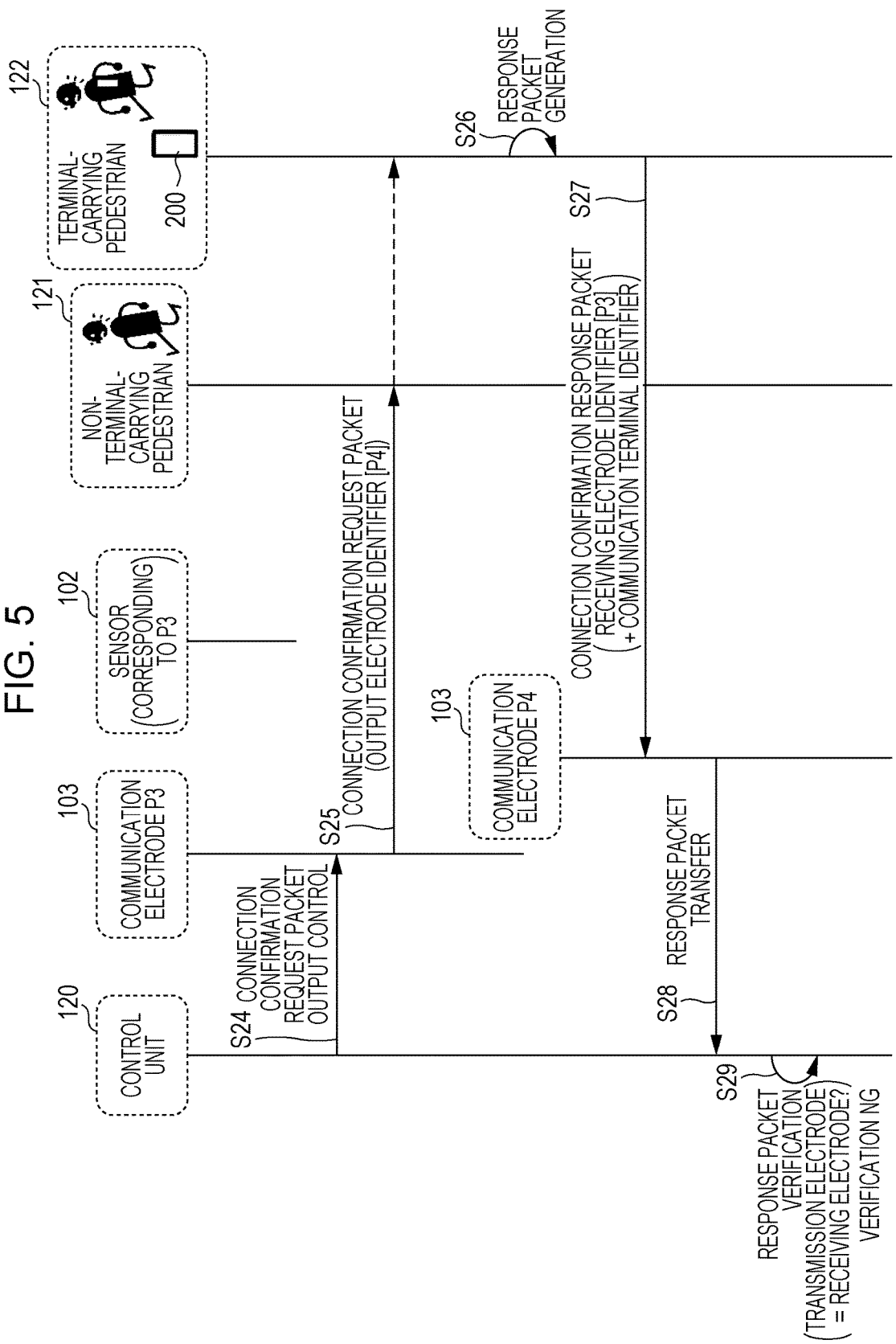
FIG. 5 is a diagram for describing the processing sequence in the case where the pedestrian enters the gate apparatus.

Next, referring to sequence diagrams illustrated in FIGS. 4 and 5, specific processing tasks, which are performed by each constituent of the gate apparatus 100 and by the human body communication terminal 200 in a case where the pedestrians (the non-terminal-carrying pedestrian 121 and the terminal-carrying pedestrian 122 illustrated in FIG. 3) enter the gate apparatus in succession, and a communication sequence, are described.

The sequence diagrams illustrated in FIGS. 4 and 5 are sequence diagrams for describing in a time series all processing tasks that are performed from a point in time (Step S11) confirmation which the non-terminal-carrying pedestrian 121 enters the gate apparatus to a point in time confirmation which comparison verification processing (Step S29) of the electrode identifier described above is performed. Processing in each step is sequentially described below.

Step S11

In Step S11, the non-terminal-carrying pedestrian 121 enters the gate apparatus 100 and reaches a position of the human body communication electrode P4.

Step S12

When the human body detection sensor 102 within the gate apparatus 100 detects that the pedestrian enters the position of the human body communication electrode P4, sensor-detected information is output to a control unit 120 of the gate apparatus 100.

Moreover, the human body detection sensor 102 is configured in such a manner that sensor portions that are associated with positions of the human body communication electrodes P1 to P4, respectively, output a detection signal individually, in which case the human body detection sensor 102 corresponding to the position of the human body communication electrode P4 outputs the detection signal to the control unit 120. With the detection signal that is input from the human body detection sensor 102 at a position corresponding to the position of the human body communication electrode P4, the control unit 120 determines that the pedestrian enters the position of the human body communication electrode P4.

Step S13

Next, in Step S13, the control unit 120 generates the connection confirmation request packet according to the detection signal received from the human body detection sensor 102.

The electrode identifier of the electrode that outputs the connection confirmation request packet is stored in the connection confirmation request packet to be generated.

The electrode that outputs a packet is in the electrode position in which the pedestrian is detected, and is determined according to a position of the human body detection sensor 102 that outputs the detection information on the pedestrian. In this case, because the detection information is input from the human body detection sensor 102 at the position of the electrode P4, the electrode that transmits the packets is the electrode P4.

Therefore, the electrode identifier P4 of the electrode that outputs the connection confirmation request packet is stored in the connection confirmation request packet.

Steps S14 to S15

Under the control of the control unit 120, the connection confirmation request packet in which the identifier P4 of the electrode that outputs the packet is stored is output through the electrode P4 in the human body communication electrode group 103.

The processing in each of Steps S11 to S15 is processing that is performed in a state where only the non-terminal-carrying pedestrian 121 enters the gate apparatus 100.

In this state, because the human body communication terminal that receives the connection confirmation request packet that is transmitted from the electrode P4 is not present, it is difficult for the gate apparatus 100 to receive the response packet from the human body communication terminal.

Therefore, an error is obtained when confirmation for the connection to the human body communication terminal, and the processing is completed without performing the processing that opens the gate opening and closing unit 101.

Processing tasks that are performed from next Step S21 to Step S29 in FIG. 5 are processing tasks that are performed in a case where the terminal-carrying pedestrian 122 that follows the non-terminal-carrying pedestrian 121 enters the gate apparatus 100. This processing sequence is described below.

Step S21

In Step S21, the non-terminal-carrying pedestrian 121 reaches a position of the human body communication electrode P3 of the gate apparatus 100 and then the terminal-carrying pedestrian 122 who carries the human body communication terminal 200 reaches the position of the human body communication electrode P4.

Step S22

When the human body detection sensor 102 within the gate apparatus 100 detects that the pedestrian reaches the position of the human body communication electrode P3, a sensor that is set to be at the position of the human body communication electrode P3, and that corresponds to the electrode P3 outputs the sensor-detected information to the control unit 120 of the gate apparatus 100.

Moreover, states in Step S21 and S22 are equivalent to the state illustrated in FIG. 3, the human body detection sensors 102 in positions corresponding to the electrodes P3 to P4, respectively, are in a state of detecting the human body, and both the human body detection sensors 102 at the positions corresponding to the electrodes P3 to P4, respectively, output the detection information.

In such a case, the control unit 120 of the gate apparatus 100 preferentially performs processing on the detection information from the sensor that is in a furthest ahead position in the gate apparatus 100, that is, the position that is closest to the gate opening and closing unit 101.

That is, in a setting illustrated in FIG. 3, the processing is performed on the sensor-detected information from the sensor that corresponds to the electrode P3 that is set to be at the position of the human body communication electrode P3.

Step S23

In Step S23, the control unit 120 generates the connection confirmation request packet according to the detection signal received from the human body detection sensor 102. The electrode identifier of the electrode that outputs the connection confirmation request packet is stored in the connection confirmation request packet that is generated.

The electrode that outputs a packet is in the electrode position in which the pedestrian is detected, and is determined according to a position of the human body detection sensor 102 that outputs the detection information on the pedestrian.

As described above, the control unit 120 preferentially performs the processing on the detection information from the sensor that is in the furthest ahead position in the gate apparatus 100, that is, the position that is closest to the gate opening and closing unit 101.

In the state illustrated in FIG. 3, the detection information from the sensor that is in the furthest ahead position in the gate apparatus 100, that is, the position that is closest to the gate opening and closing unit 101 is detection information from the human body detection sensor 102 that is at the position of the electrode P3. Therefore, the electrode that outputs the packet is the electrode P3.

The control unit 120 stores the output electrode identifier P3 of the electrode that outputs the connection confirmation request packet, in the connection confirmation request packet that is generated.

Steps S24 and S25

Under the control of the control unit 120, the connection confirmation request packet in which the identifier P3 of the electrode that outputs the packet is stored is output through the electrode P3 in the human body communication electrode group 103.

As illustrated in the sequence diagram in FIG. 5, the packet that is output from the electrode P3 is transferred from the human body of the non-terminal-carrying pedestrian 121 on the electrode P3 through the human body of the terminal-carrying pedestrian 122 on the electrode P4, and reaches and is received by the human body communication terminal 200 that the terminal-carrying pedestrian 122 carries.

Step S26

The human body communication terminal 200 that the terminal-carrying pedestrian 122 on the electrode P4 carries generates the connection confirmation response packet as the response packet corresponding to the connection confirmation request packet that is output from the electrode P3 and that is received through the human bodies of the non-terminal-carrying pedestrian 121 and the terminal-carrying pedestrian 122.

As described above referring to FIG. 3, the connection confirmation response packet is a packet in which the output electrode identifier that is data stored in the received connection confirmation request packet and the terminal identifier that is an identifier of the human body communication terminal 200 itself are stored.

The human body communication terminal 200 generates and outputs the output electrode identifier P3 that is the data stored in the received connection confirmation request packet and the "connection confirmation response packet" in which the terminal identifier that is the identifier of the human body communication terminal 200 itself is stored.

Step S27 and S28

The connection confirmation response packet in which the output electrode identifier P3 and the terminal identifier are stored is transferred to the human body communication electrode group 103 of the gate apparatus 100 over the shortest route through the human body. As described referring to FIG. 3, in the example in FIG. 3, because the electrode on the shortest route from the human body communication terminal 200 through the human body is the electrode P4, the gate apparatus 100 receives the connection confirmation response packet through the electrode P4 and the connection confirmation response packet is transferred from the electrode P4 to the control unit 120.

Step S29

The control unit 120 of the gate apparatus 100 determines whether or not the output electrode identifier, which is stored in the connection confirmation response packet received through the electrode P4, and the identifier of the electrode that receives the connection confirmation response packet agree with each other.

In this example, the output electrode identifier that is stored in the connection confirmation response packet is P3 and the identifier of the electrode that receives the connection confirmation response packet is P4. Based on these associations, it is determined that the two electrode identifiers do not agree with each other.

In a case where the output electrode identifier, which is stored in the connection confirmation response packet that is received in this manner, and the identifier of the electrode, which receives the connection confirmation response packet, do not agree with each other, the control unit 120 performs neither the processing thereafter, for example, the authentication processing such as the validity confirmation of the human body communication terminal, the billing processing, or the like, nor the opening processing of the gate opening and closing unit 101. Moreover, in this case, the control unit 120 may perform processing such as that of outputting an alarm sound indicating an occurrence of an error.

Figure 6:
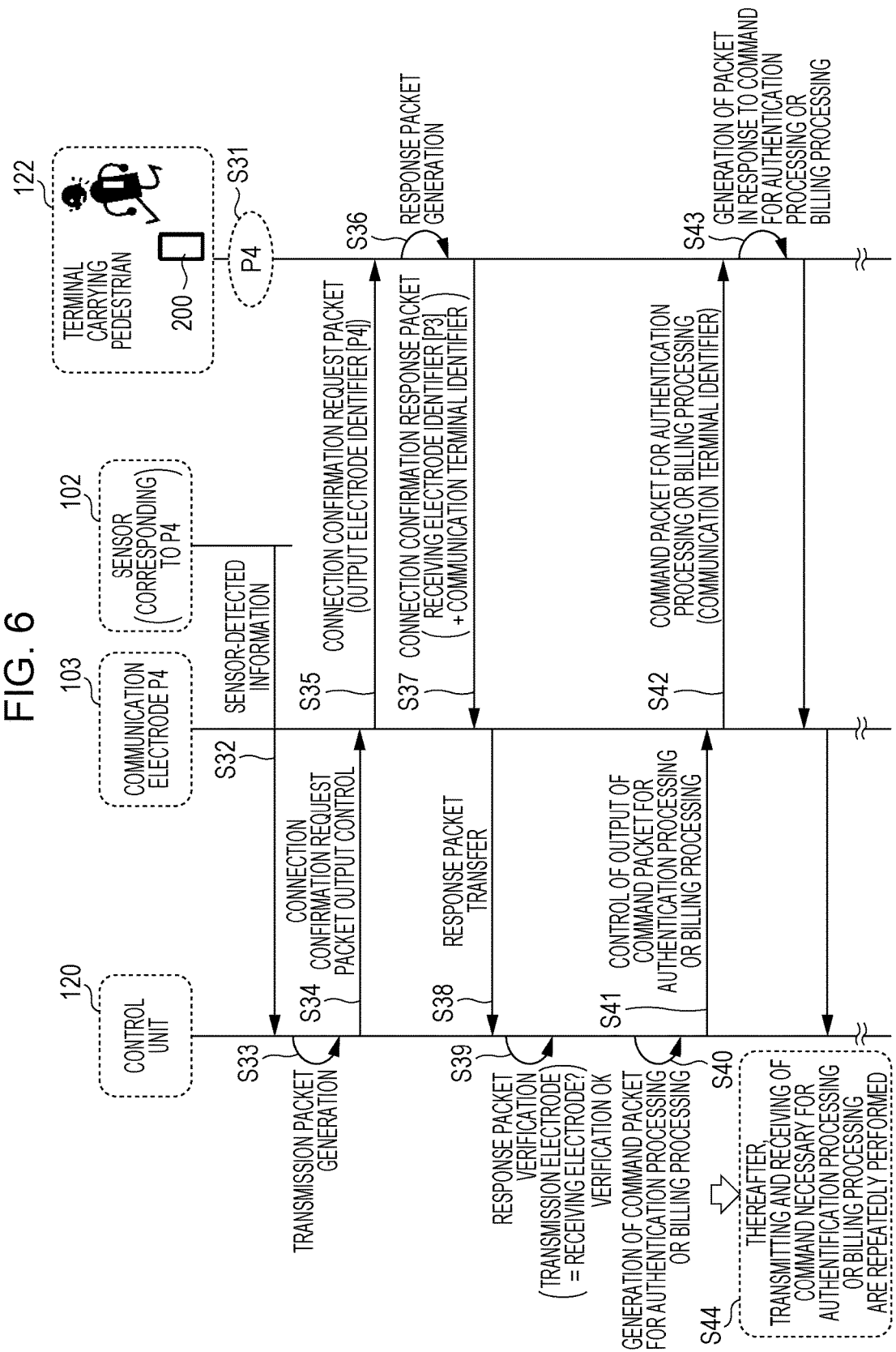
FIG. 6 is a diagram for describing the processing sequence in the case where the pedestrian enters the gate apparatus.

Next, as a reference example, referring to a sequence that is illustrated in FIG. 6, a processing sequence is described that is performed in a case where the terminal-carrying pedestrian 122 who carries the human body communication terminal 200 is the first to enter the gate apparatus 100.

Step S31

First, in Step S31, the terminal-carrying pedestrian 122 enters the gate apparatus 100 and reaches the position of the human body communication electrode P4.

Step S32

When the human body detection sensor 102 within the gate apparatus 100 detects that the pedestrian enters the position of the human body communication electrode P4, the sensor-detected information is output to the control unit 120 of the gate apparatus 100.

Step S33

Next, in Step S33, the control unit 120 generates the connection confirmation request packet according to the detection signals received from the human body detection sensor 102.

The electrode identifier of the electrode that outputs the connection confirmation request packet is stored in the connection confirmation request packet that is generated.

The electrode that outputs a packet is confirmation the electrode position confirmation which the pedestrian is detected, and is determined according to a position of the human body detection sensor 102 that outputs the detection information on the pedestrian. In this case, because the detection information is input from the human body detection sensor 102 at the position of the electrode P4, the electrode that transmits the packet is the electrode P4.

Therefore, the output electrode identifier P4 of the electrode that outputs the connection confirmation request packet is stored in the connection confirmation request packet.

Steps S34 to S35

Under the control of the control unit 120, the connection confirmation request packet in which the identifier P4 of the electrode that outputs the packet is stored is output through the electrode P4 in the human body communication electrode group 103.

The packet that is output from the electrode P4 is transferred through the human body of the terminal-carrying pedestrian 122 on the electrode P4, and reaches and is received by the human body communication terminal 200 that the terminal-carrying pedestrian 122 carries.

Step S36

The human body communication terminal 200 that the terminal-carrying pedestrian 122 on the electrode P4 carries generates the connection confirmation response packet as the response packet corresponding to the connection confirmation request packet that is output from the electrode P4 and that is received through the human body of the terminal-carrying pedestrian 122.

As described above referring to FIG. 3, the connection confirmation response packet is a packet in which the output electrode identifier that is data stored in the received connection confirmation request packet and the terminal identifier that is an identifier of the human body communication terminal 200 itself are stored.

The human body communication terminal 200 generates and outputs the output electrode identifier P4 that is the data stored in the received connection confirmation request packet and the "connection confirmation response packet" in which the terminal identifier that is the identifier of the human body communication terminal 200 itself is stored.

Steps S37 and S38

The connection confirmation response packet in which the output electrode identifier P4 and the terminal identifier are stored is transferred to the human body communication electrode group 103 of the gate apparatus 100 over the shortest route through the human body. Because the electrode on the shortest route from the human body communication terminal 200 through the human body is the electrode P4, the gate apparatus 100 receives the connection confirmation response packet through the electrode P4 and the connection confirmation response packet is transferred from the electrode P4 to the control unit 120.

Step S39

The control unit 120 of the gate apparatus 100 determines whether or not the output electrode identifier, which is stored in the connection confirmation response packet received through the electrode P4, and the identifier of the electrode that receives the connection confirmation response packet agree with each other.

In this example, the output electrode identifier that is stored in the connection confirmation response packet is P4, and the identifier of the electrode that receives the connection confirmation response packet is P4. Based on these associations, it is determined that the two electrode identifiers agree with each other.

Steps S40 to S44

Figure 7:
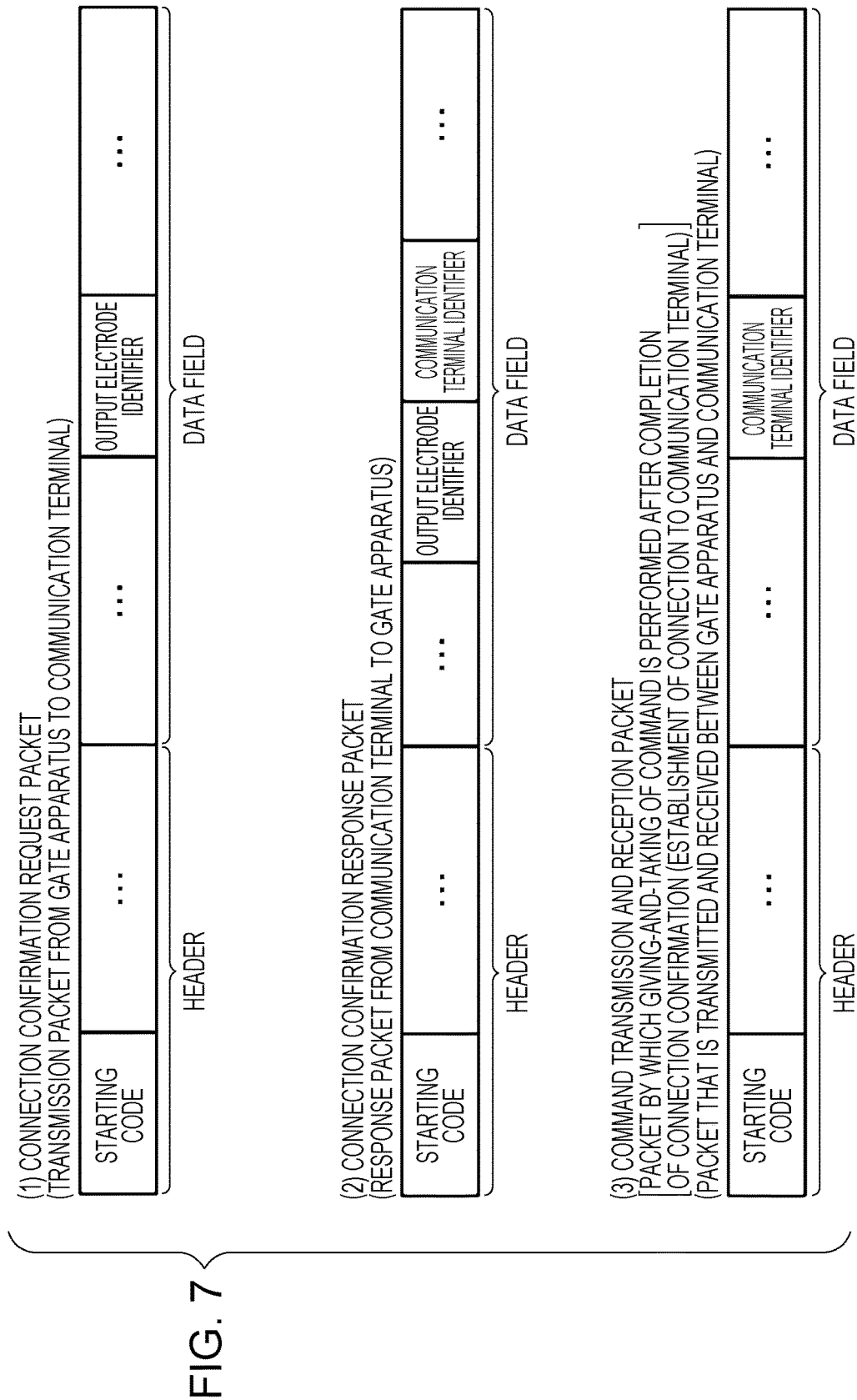
FIG. 7 is a diagram for describing a configuration example of a packet that is transmitted and received between the gate apparatus and a human body communication terminal.

In a case where the output electrode identifier, which is stored in the connection confirmation response packet that is received in this manner, and the identifier of the electrode, which receives the connection confirmation response packet, agree with each other, the control unit 120 performs the processing thereafter, for example, necessary data processing, such as the authentication processing such as the validity confirmation of the human body communication terminal, or the billing processing. Moreover, a packet by which the command is transmitted and received, which is illustrated in (3) of FIG. 7, is used in performing these data processing tasks.

Moreover, in a case where predetermined processing is completed, the gate apparatus 100 may transmit a packet that notifies the human body communication terminal 200 of connection confirmation completion.

Step S44

The control unit 120 performs necessary processing, such as the authentication processing such as the validity confirmation of the human body communication terminal, the billing processing, or the like. Then, when predetermined processing is completed, the control unit 120 performs the opening processing of the gate opening and closing unit 101 and allows the terminal-carrying pedestrian 122 to pass through the gate apparatus 100.

In this manner, in the case where the terminal-carrying pedestrian 122 that carries the human body communication terminal 200 is the first to enter the gate apparatus 100, the terminal-carrying pedestrian 122 is allowed to pass through the gate apparatus 100.

That is, in the case, the output electrode identifier that is stored in the connection confirmation response packet is P4, and the identifier of the electrode that receives the connection confirmation response packet is P4. Based on these associations, it is determined that the two electrode identifiers agree with each other, and thus, the terminal-carrying pedestrian 122 is allowed to pass through the gate apparatus 100.

3. Configuration Example of Communication Packet

As described referring to FIGS. 3 to 6, between the gate apparatus 100 and the human body communication terminal 200, multiple different packets are generated and are transmitted and received.

Types of packets and packet-stored data are described referring to (1) to (3) of FIG. 7. FIG. 7 illustrates configurations of three packets described below and main pieces of data that are stored.

(1) Connection confirmation request packet
(2) Connection confirmation response packet
(3) Packet by which a command is transmitted and received.

(1) A connection confirmation request packet is a packet that is generated by the gate apparatus, and is transmitted from the gate apparatus to the human body communication terminal.

As described referring to FIG. 3, the connection confirmation request packet is output from the human body communication electrode group 103 that is at a position of the human body detected by the human body detection sensor 102 of the gate apparatus 100. In the example illustrated in FIG. 3, the connection confirmation request packet is set to be output from any one among the electrodes P1 to P4.

The connection confirmation request packet, illustrated in (1) of FIG. 7, is configured from a head portion, and a data field.

A starting code indicating a starting position of the packet, a packet identification code indicating a type of packet, or the like is stored in the header portion. The electrode identifier according to which the connection confirmation request packet is output, for example, any one among the identifiers P1 to P4, is stored in the data field.

(2) The connection confirmation response packet is a response packet with respect to the connection confirmation request packet, is generated by the human body communication terminal that receives the connection confirmation request packet, and is transmitted from the human body communication terminal to the gate apparatus. The connection confirmation response packet, as illustrated in (2) of FIG. 7, is configured from a header portion and a data field.

The starting code indicating the starting position of the packet, the packet identification code indicating the type of packet, or the like is stored in the header portion.

The output electrode identifier, which is stored in the connection confirmation request packet received from the gate apparatus, that is, the electrode identifier (for example, any one among P1 to P4) according to which the connection confirmation request packet is output, and a communication terminal identifier that is an identifier of the human body communication terminal itself are stored in the data field. Moreover, the communication terminal identifier is an ID that is stored in a non-volatile memory or the like within the human body communication terminal.

(3) The packet by which a command is transmitted and received, as described referring to the sequence diagram illustrated in FIG. 6, is a packet that is transmitted and received between the gate apparatus and the human body communication terminal, in the processing that is performed after the completion of connection confirmation processing, for example, in the processing, such as the authentication processing such as the validity confirmation of the human body communication terminal, the billing processing, or the like.

The packet by which the command is transmitted and received, as illustrated in (3) of FIG. 7, is configured from a header portion and a data field. The starting code indicating the starting position of the packet, the packet identification code indicating the type of packet, or the like is stored in the header portion.

The communication terminal identifier, which is stored in the connection confirmation response packet received from the human body communication terminal, that is, the communication terminal identifier, which is an identifier of the human body communication terminal that is a transmission source of the connection confirmation response packet, is stored in the data field.

4. Configuration Example of the Gate Apparatus, and a Human Body Communication Terminal Next, configuration examples of the gate apparatus 100 and the human body communication terminal 200 are described referring to FIGS. 8 and 9.

4-1. Configuration of the Gate Apparatus

Figure 8:
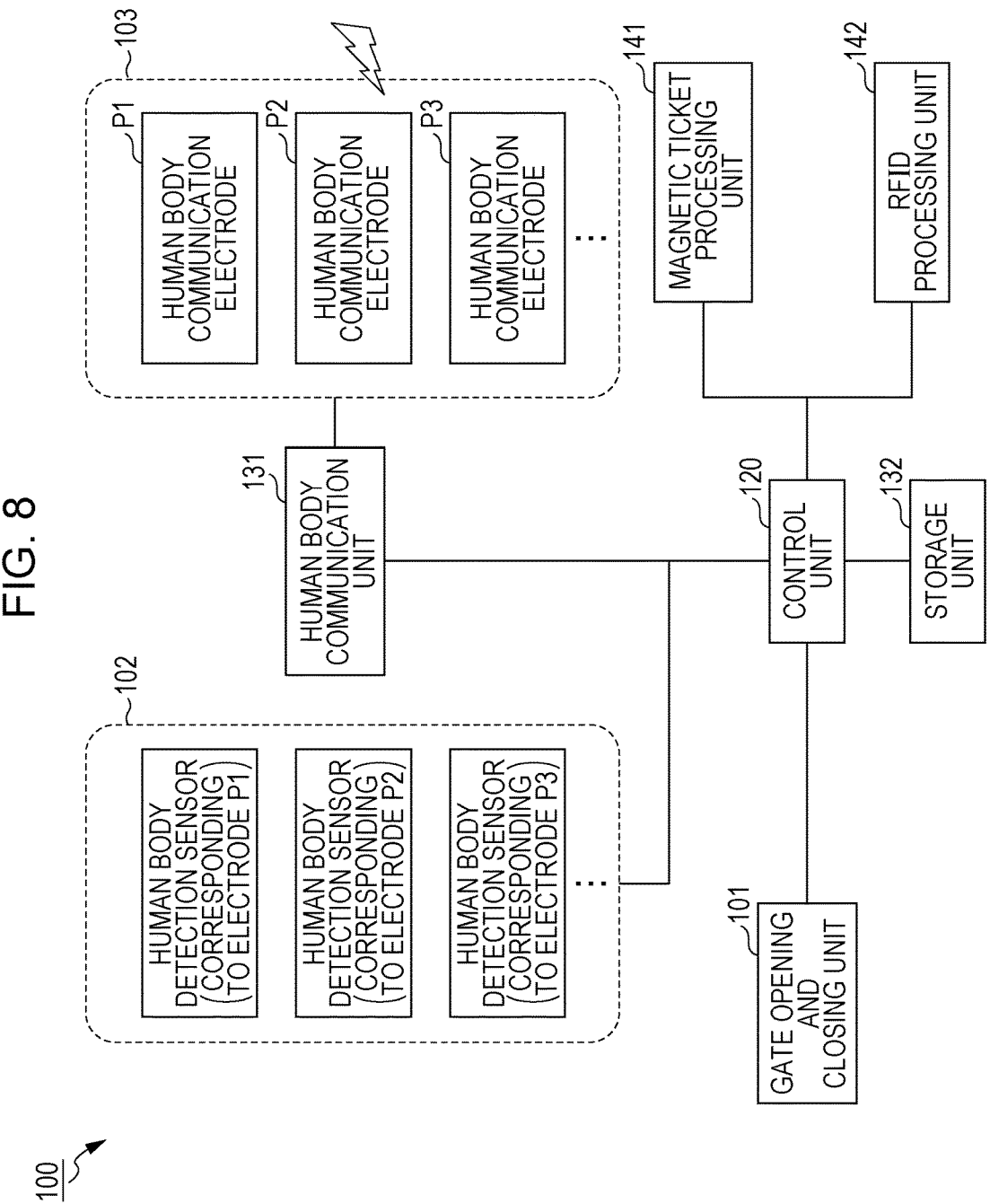
FIG. 8 is a diagram for describing a configuration example of the gate apparatus.

First, the configuration example of the gate apparatus 100 is described referring to FIG. 8.

The gate apparatus 100, as illustrated in FIG. 8, has the gate opening and closing unit 101, the human body detection sensor 102, the human body communication electrode group 103, the control unit 120, a human body communication unit 131, a storage unit 132, a magnetic ticket processing unit 141, and an RFID processing unit 142. Moreover, the gate apparatus 100 illustrated in FIG. 8 is a configuration example of a ticket examining machine in a station.

The magnetic ticket processing unit 141 is an interface that performs magnetic data-reading or -writing on a ticket or season ticket that has magnetic data, and transmits and receives the magnetic data.

The RFID processing unit 142 includes a communication unit that performs proximity communication using an electromagnetic field or electromagnetic waves or a data transmitting and receiving unit, and performs the communication with an IC card or the like.

The control unit 120 performs the validity confirmation of the ticket or season ticket that has the magnetic data, the IC card, or the like, which the gate-passing pedestrian carries, according to information that is input through the magnetic ticket processing unit 141 and the RFID processing unit 142, and controls the gate opening and closing unit 101 according to a result of the validity confirmation. Thus, the control unit 120 approves or prohibits the pedestrian's passing-through.

This processing that uses the magnetic ticket processing unit 141 and the RFID processing unit 142 has the same configuration as the processing in an existing ticket examining machine does.

The gate apparatus 100 according to the present disclosure further performs the human body communication through the human body of the gate-passing pedestrian. Control of the pedestrian's passing-through is performed by performing the human body communication.

A configuration that applies to the processing is described in detail below.

The gate opening and closing unit 101, the human body detection sensor 102, and the human body communication electrode group 103 correspond to those illustrated in FIG. 3, respectively, in terms of configuration. The control unit 120 performs opening and closing control on the gate opening and closing unit 101.

As described above referring to FIGS. 3 to 6, in a case where predetermined communication with the human body communication terminal succeeds and for example, processing that is prescribed in advance, such as the authentication processing or the billing processing, is completed, the opening processing is performed under the control of the control unit 120 and the gate-passing pedestrian's passing-through is approved.

The human body detection sensor 102 is a sensor that detects the pedestrian who enters the gate apparatus 100, and for example, is configured from an optical sensor, or the like.

The multiple human body detection sensors 102 are set to be confirmation positions that correspond to the human body communication electrodes P1 to P4, respectively, and are configured in such a manner that they determine which position of the human body communication electrodes P1 to P4 the pedestrian who passes through the gate apparatus 100 is at.

That is, the human body detection sensor 102, as illustrated in FIG. 8, is configured in such a manner that the sensor corresponding to each electrode position outputs the sensor-detected information to the control unit 120 with sensors 102 (P1) to 102 (P4) corresponding to the human body communication electrodes P1 to P4 respectively.

Moreover, in a case where the gate apparatus 100 is used in the station or the like, because it is not necessary to detect a pedestrian who is a person who is not subject to billing calculation, such as a child, the configuration may be provided in such a manner that by adjusting the height confirmation which the human body detection sensor 102 is set, the child is not detected confirmation that height.

Alternatively, in a case where the sensors are set to be parallel in a low position and in a high position and the control unit 120 inputs the detection information only from the sensors confirmation lower position, the configuration may be provided in such a manner that processing is performed which determines that a pedestrian is a child and is not a processing target (billing target).

The human body communication electrode group 103 is a human body communication electrode group for transmitting and receiving each packet that is described referring to FIG. 7, and is configured from the multiple electrodes that result from the division in the direction of proceeding through the gate apparatus 100. For example, the human body communication electrode group 103 is configured from the four electrodes illustrated in FIG. 3, the human body communication electrodes P1 to P4.

Each electrode transmits and receives each packet that is described referring to FIG. 7. The control unit 120 performs the control of the processing that is performed by the gate apparatus 100.

The control unit 120, for example, obtains positional information on the preceding pedestrian who enters the gate apparatus 100 based on the information detected by the human body detection sensor 102, and performs confirmation of whether or not the detected pedestrian has the right to pass through the gate apparatus 100.

The confirmation of whether or not there is the right may be performed as processing that uses any one among processing tasks in which the magnetic ticket processing unit 141, the RFID processing unit 142, and the human body communication unit 131 are used, but processing by the control unit 120 in a case where the human body communication unit 131 is used is described below.

The control unit 120 inputs the sensor-detected information from the human body detection sensor 102, determines where the sensor from which the detection information is output is positioned, and identifies a position of the pedestrian.

Additionally, the control unit 120 selects the electrode that is closest to the position of the pedestrian, as a human body communication electrode, and controls the transmission and reception of the packet to and from the human body communication terminal.

Additionally, the control unit 120 performs generation of the transmission packet, analysis of the received packet, and the authentication processing, and performs control processing that opens and closes the gate opening and closing unit 101, and the like.

The human body communication unit 131 performs generation of a human body communication electric field, and the like. Electric field generation processing for transmitting packet data is performed based on the packet that is generated by the control unit 120, and the packet data is output from the electrode that is selected by the control unit 120. An output signal is transferred through the human body of the pedestrian that is closest to the electrode, and is received by the human body communication terminal that the pedestrian carries. Specifically, the human body communication unit 131 applies voltage to any electrode that, according to selection information of the control unit 120, is selected from among the electrodes P1 to Pn that make up the human body communication electrode group 103, and performs the communication with the human body communication terminal that the pedestrian carries, by changing an electric field around the human body of the pedestrian.

Furthermore, the human body communication unit 131 analyzes electric field information corresponding to the packet that is received by the human body communication terminal that the pedestrian carries. That is, the electric field information that is transmitted by the human body communication terminal that the pedestrian carries, is transferred through the human body of the pedestrian, and is received by the human body communication electrode group 103, and the packet obtained by the analysis is transferred to the control unit 120.

The storage unit 132 is an area in which a program for processing that is performed by the gate apparatus 100, the transmission and reception data, the authentication processing data, and the like, are stored, and is used as a work area for executing the program. The storage unit 132 is configured from a RAM, a ROM, and the like. Moreover, the storage unit 132 may be configured from a recording medium that is removably mounted, such as hard disk or a flash memory.

Moreover, the control unit 120 assigns an identification number by which the pedestrian detected by the human body detection sensor 102 is individually identified, and stores the positional information on and the identification number of each pedestrian in the storage unit 132. Additionally, processing that sequentially updates the stored data is performed. The control unit 120 continues to detect the positional information on each pedestrian and update recorded data until the pedestrian passes through the gate apparatus 100.

In a case where the pedestrian passes through the gate apparatus 100, or in a case where the pedestrian return to an entrance and thus the position of the pedestrian is difficult to detect, the identification number of and the positional information on the pedestrian are removed from the storage unit 132.

4-2. Configuration of the Human Body Communication Terminal

Figure 9:
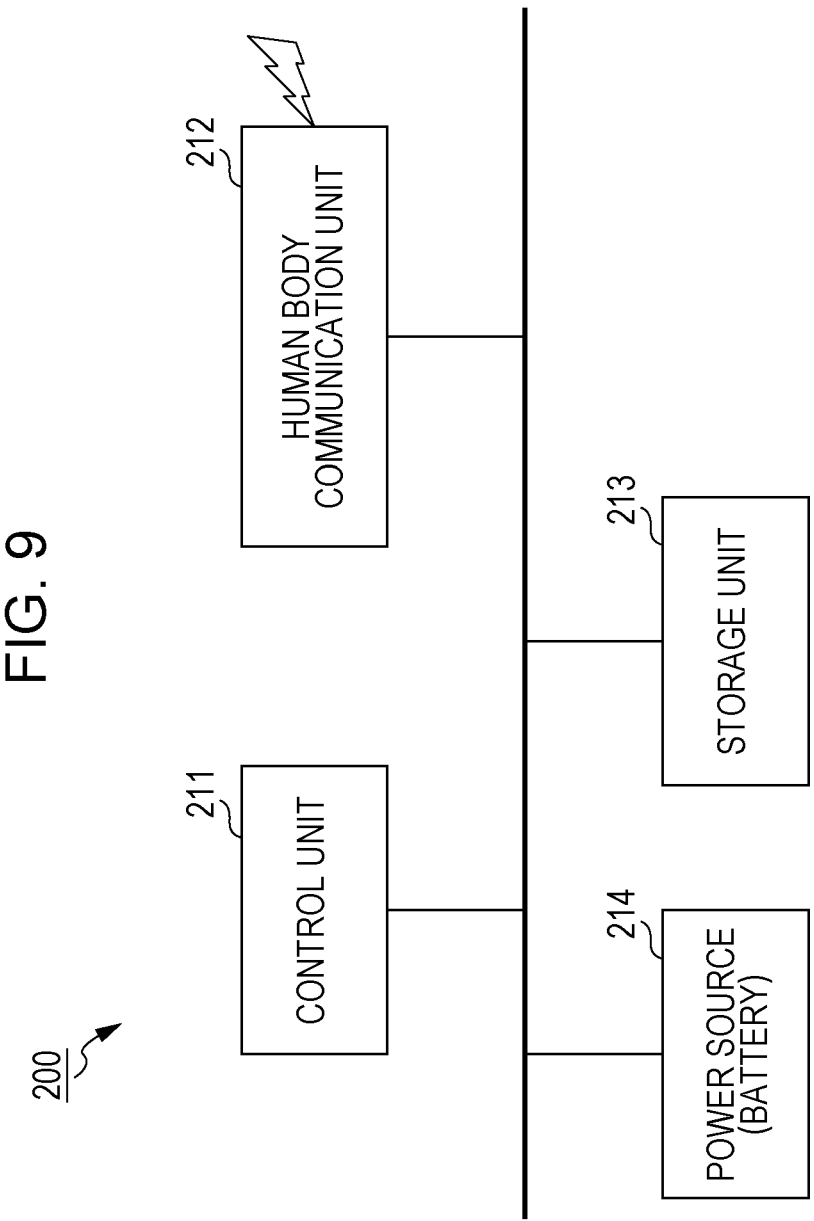
FIG. 9 is a diagram for describing a configuration example of the human body communication terminal.

Next, a configuration example of the human body communication terminal 200 that the gate-passing pedestrian carries is described referring to FIG. 9.

The human body communication terminal 200, as illustrated in FIG. 9, has a control unit 211, a human body communication unit 212, a storage unit 213, and a power source (battery) 214.

The control unit 211 performs the generation of the transmission packet with respect to the gate apparatus 100, and the analysis of the packet that is received from the gate apparatus 100, and performs processing according to a request from the gate apparatus, for example, processing according to the authentication processing or the billing processing.

The human body communication unit 212 performs generation of an electric field for transmitting the packet generated by the control unit 211, and outputting processing, and outputs to the control unit 211 the packet that is obtained by performing analysis of the electric field and thus as a result of performing such analysis, based on the packet that is transmitted by the gate apparatus 100 and is transferred through the human body.

The storage unit 213 is configured from a RAM, a ROM, or the like. A program corresponding to the processing that is executed by the control unit 211, an ID of the human body communication terminal, and the like are stored in the storage unit 213. Additionally, the storage unit 213 is used as a temporary storage area for transmission and reception packet data or a work area in the processing that is performed by the control unit 211.

The power source (battery) 214 supplies electric power to each component of the human body communication terminal 200.

5. A Gate Opening and Closing Control Sequence in the Human Body Communication

Figure 10:
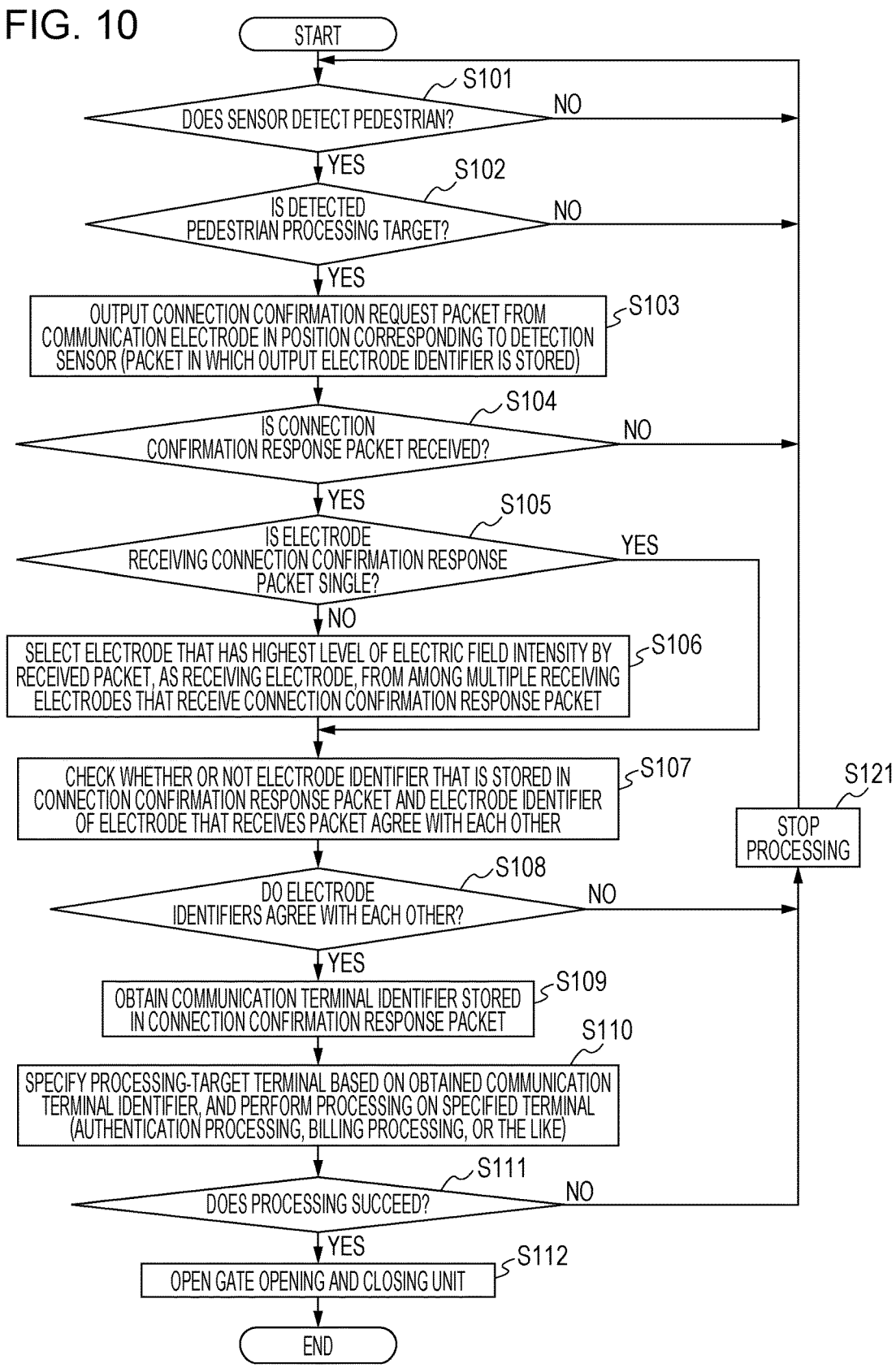
FIG. 10 is a diagram illustrating a flowchart for describing a sequence of processing that is executed by the gate apparatus.

Next, a gate opening and closing control sequence for the human body communication that is executed by the gate apparatus 100 is described referring to a flow chart illustrated in FIG. 10.

Moreover, a flow illustrated in FIG. 10 is possible under the control of the control unit 120 of the gate apparatus 100. The control unit 120 performs processing in accordance with the flow illustrated in FIG. 10, according to a program that is stored in the storage unit 132. Processing in each step in the flow illustrated in FIG. 10 is sequentially described below.

Step S101

First, it is determined whether or not the human body detection sensor 102 detects a pedestrian who enters the gate apparatus 100. In a case where the pedestrian is detected, the detection information is input into the control unit 120, and the processing proceeds to Step S102. The human body detection sensor 102, for example, is an optical sensor that is provided on a flank side of the gate apparatus 100.

Step S102

Next, the control unit 120 determines whether or not the detected gate-passing pedestrian is a processing target, based on the detection information that is input from the human body detection sensor 102.

In the flow, as described above, in a case where the human body detection sensors 102 are set to be parallel in the low position and in the high position and the control unit 120 inputs the detection information only from the sensors confirmation lower positions, the processing is performed which determines that the pedestrian is a child and is not a processing target (billing target). In this case, the processing returns to Step S101 without proceeding to Step S103.

On the other hand, in a case where the control unit 120 inputs the detection information only from the sensors confirmation higher positions, it is determined that the pedestrian is not a child and is a processing target (billing target). In this case, the processing proceeds to Step S103.

Step S103

When it is determined in Step S102 that the pedestrian within the gate apparatus 100 is a processing target, next in Step S103, the connection confirmation request packet is output from the human body communication electrode group 103 at a position corresponding to a human body detection sensor 102.

As described above referring to FIG. 3, the sensor portions of the human body detection sensor 102, which correspond to the human body communication electrodes P1 to P4, respectively, individually output the detection signals. The control unit 120 determines which one of human body communication electrode positions of the human body communication electrodes P1 to P4 a position of the human body detection sensor 102 from which the detection signal is input correspond to, and determines which position of the human body communication electrodes P1 to P4 the pedestrian is at.

According to a result of the determination, the human body communication electrode at the position that the pedestrian is determined as being at is set to be the packet output electrode, and outputs the connection confirmation request packet.

Moreover, the electrode identifier of the electrode that outputs the connection confirmation request packet is stored in the connection confirmation request packet. That is, the connection confirmation request packet that is configured as illustrated in (1) of FIG. 7 is generated and is output.

Step S104

Next, the control unit 120 waits to receive the connection confirmation response packet and, determines whether or not the connection confirmation response packet is received within a prescribed time that is set in advance.

In a case where the connection confirmation response packet is not received, the processing returns to Step S101 without Step S105 and subsequent steps being performed. In this case, the gate opening and closing unit 101 that is illustrated in FIG. 3 is not opened. On the other hand, in a case where the connection confirmation response packet is received within the described time that is set in advance, the processing proceeds to Step S105.

Step S105

In a case where the control unit 120 receives the connection confirmation response packet within the described time that is set in advance, in Step S105, the control unit 120 determines whether the multiple human body communication electrode group 103 includes the single human body communication electrode or the multiple human body communication electrodes.

As described above, because the communication through the electric field around the human body is performed in the human body communication, there is a likelihood that not only the single electrode or but also the multiple electrodes in the human body communication electrode group 103 will concurrently receive the connection confirmation response packet. For example, there is a likelihood that the connection confirmation response packet will be concurrently received by the electrodes P3 and P4 that are illustrated in FIG. 3.

In Step S105, it is determined whether the packet is received by the single electrode, or is received by the multiple electrodes.

In a case where the packet is received by the single electrode, the processing proceeds to Step S107. On the other hand, in a case where the packet is received by the multiple electrodes, the processing proceeds to Step S106.

Step S106

Step S106 is performed in the case where the connection confirmation response packet is received by the multiple electrodes (for example, the electrode P3 and the electrode P4 that are illustrated in FIG. 3). In a case where in this manner, it is confirmed that the packet is received by the multiple electrodes, the electrode that has the high reception level is selected as a reception electrode.

Steps S107 and S108

Next, in Steps S107 and Step S108, the control unit 120 performs the processing that checks whether or not the electrode identifier stored in the connection confirmation response packet and the electrode identifier of the electrode that receives the packet agree with each other.

Moreover, the electrode identifier stored in the connection confirmation response packet is the same identifier as the output electrode identifier that is stored in the connection confirmation request packet that is transmitted from the gate apparatus 100 to the human body communication terminal 200.

That is, processing in each of Steps S107 and S108 is equivalent to processing that determines whether or not the electrode that transmits the connection confirmation request packet from the gate apparatus 100 to the human body communication terminal 200 and the electrode that receives the connection confirmation response packet transmitted from the human body communication terminal 200 to the gate apparatus agree with each other.

In a case where it is determined that the electrode identifier stored in the connection confirmation response packet and the electrode identifier of the electrode that receives the packet agree with each other, the processing proceeds to Step S109. On the other hand, in a case where it is determined that the two electrode identifiers do not agree with each other, the processing proceeds to Step S121, stops, and returns to Step S101. In this case, the gate opening and closing unit 101 maintains the closed state without being opened.

Step S109

In a case where it is determined that the electrode identifier stored in the connection confirmation response packet and the electrode identifier of the electrode that receives the packet agree with each other, in Step S109, the control unit

120 obtains the communication terminal identifier stored in the connection confirmation response packet received from the human body communication terminal 200.

The communication terminal identifier is an identifier (ID) of the human body communication terminal, which is output by receiving the connection confirmation request packet from the gate apparatus 100 and generating the connection confirmation response packet. The identifier (ID) of the human body communication terminal is an identifier (ID) that is stored in a storage unit of the human body communication terminal.

Steps S110 to S111

Next, in Step S110, the control unit 120 specifies a processing target terminal based on the communication terminal identifier obtained from the connection confirmation response packet, and performs processing on the specified terminal. For example, the authentication processing, the billing processing, or the like is performed. In a case where the processing succeeds, the processing proceeds to Step S112.

On the other hand, in a case where the processing fails, for example, in a case where an error is obtained when confirmation the authentication processing of the human body communication terminal 200 and thus the validity confirmation of the human body communication terminal 200 is difficult to check, in a case where there is an error in the billing processing, or the like, the processing proceeds to Step S121, stops, and returns to Step S101. In this case, the gate opening and closing unit 101 maintains the closed state without being opened.

Step S112

In Steps S110 and S111, when the authentication processing or the billing processing succeeds based on the communication terminal identifier obtained from the connection confirmation response packet, in Step S112, the control unit 120 opens the gate opening and closing unit 101 to allow the gate-passing pedestrian to pass through.

Moreover, in a case where the connection confirmation processing is completed, the gate apparatus 100 may transmit a packet notifying the connection confirmation completion to the human body communication terminal 200.

6. Specific Examples and Modification Examples of Each Component of and Processing by the Gate Apparatus Next, specific examples and modification examples of each component of and processing by the gate apparatus 100 are described.

6-1. Setting Example of a Width of the Human Body Communication Electrode

The human body communication electrode group 103 of the gate apparatus 100, as illustrated in FIG. 3, is divided into the multiple electrodes, such as the electrodes P1 to P4, and the multiple electrodes are configured in such a manner that they individually transmit and receive packet.

Various ways of setting the human body communication electrode group 103 to be divided into the multiple electrodes are possible. However, the setting has to be performed in such a manner that the multiple pedestrians do not step on the electrode at the same time. For this reason, it is desirable that the width of the electrode in the direction of proceeding through the gate apparatus be as small as possible. However, on the other hand, the likelihood of the pedestrian straddling the multiple human body communication electrodes has to be decreased. For this reason, it is desirable that the width of the electrode be greater than a size of an ordinary adult person.

From these conditions, it is preferable that the width of the human body communication electrode be set to approximately 40 cm to 50 cm.

6-2. Relative Position of the Human Body Communication Electrode and the Human Body Detection Sensor As described above, the human body detection sensor 102 is individually set to be at a position that corresponds to each of the electrodes P1 to P4 in the human body communication electrode group 103. The control unit 120 performs processing that determines which position of the human body detection sensor 102 the detection is output from, specifies a position of the pedestrian within the gate apparatus 100, and selects the electrode that corresponds to the specified position, as the electrode that transmits the packet.

However, as described above, in the human body communication, there is a likelihood that the communication data will be transferred through the multiple human bodies.

In the processing in which the electrode identifier described referring to FIG. 3 and subsequent figures is used, each pedestrian who enters the gate apparatus can be determined by determining whether or not the electrode that transmits the packet and the electrode that receives the packet agree with each other, and thus it is possible to determine whether the pedestrian is the preceding pedestrian who does not carry the human body communication terminal or is the following pedestrian who carries the human body communication terminal.

Figure 11:
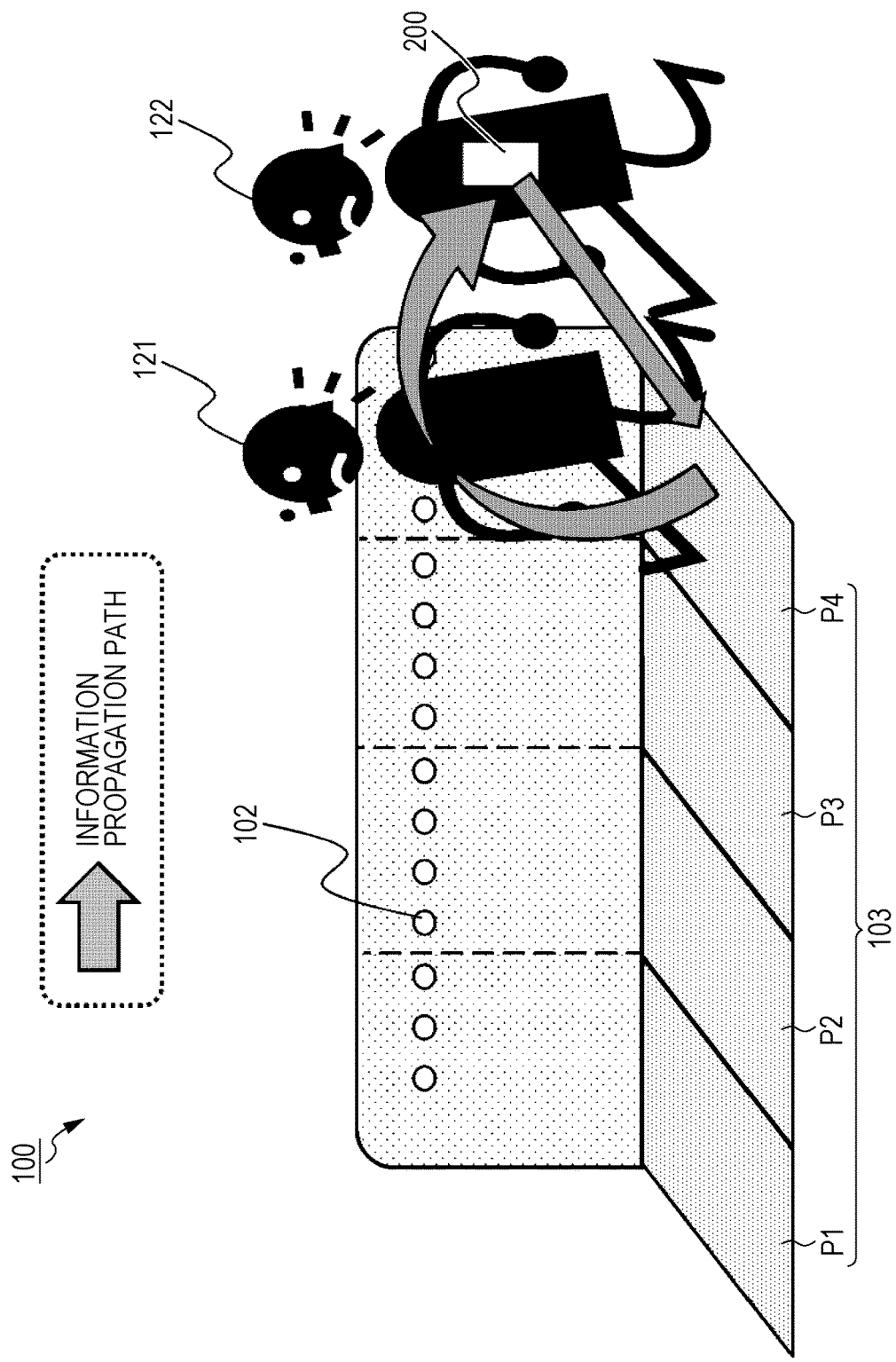

However, even with this configuration, there is a case where a problem occurs in a case where detection of the right of the pedestrian is performed at the entrance of the gate apparatus 100. For example, as illustrated in FIG. 11, a case where the non-terminal-carrying pedestrian 121 and the terminal-carrying pedestrian 122 enter in succession from the vicinity of the entrance of the gate apparatus 100 is considered.

In a case where the non-terminal-carrying pedestrian 121 is detected in the human body communication electrode P4 that is a portion of the entrance of the gate apparatus 100 and the packet is output from the electrode P4, when the human body communication terminal 200 of the terminal-carrying pedestrian 122 who does not enter the gate apparatus 100 receives the packet and transmits the response packet, there is a case where the response packet is received by the electrode P4.

In this case, both of the electrode that transmits the packet and the electrode that receives the packet are the electrode P4, and thus, even though the processing is performed according to the embodiment describe above, it is difficult to individually distinguish between the gate-passing pedestrians.

In order to prevent this situation, the human body detection sensor 102 may be configured in such a manner that the human body detection sensor 102 is not set to be at a position that corresponds to the first human body communication electrode (the electrode P4 in the examples illustrated in FIGS. 3 and 11) in the direction of proceeding through the gate apparatus 100.

For example, in the examples illustrated in FIGS. 3 and 11, the human body detection sensor 102 is set to be only at the positions corresponding to the human body communication electrodes P1 to P3. The human body detection sensor 102 is not set to be at the position that corresponds to the human body communication electrode P4. By performing the setting in this manner, it is possible to increase the certainty with which the pedestrian is individually identified by confirmation whether the electrode that transmits the packet and the electrode that receives the packet, which are described according to the embodiment described above, agree with each other.

6-3. Processing in a Case where a Human Body Straddles the Multiple Human Body Communication Electrodes As described referring to FIG. 3, the human body communication electrode group 103 that includes transmission and reception electrodes of the gate apparatus 100 is divided, for setting, in the direction of proceeding through the gate apparatus 100. In the example illustrated in FIG. 3, the human body communication electrode group 103 is divided into four electrodes, the electrodes P1 to P4.

When in this manner, the human body communication electrode group 103 is divided for setting, there is a case where a foot of a pedestrian straddles the multiple human body communication electrodes.

In such a case, the sensor portions of the human body detection sensor 102, which are at the positions corresponding to the multiple electrodes, respectively, and the control unit have to determine which electrodes the packet is output from.

Figure 12:
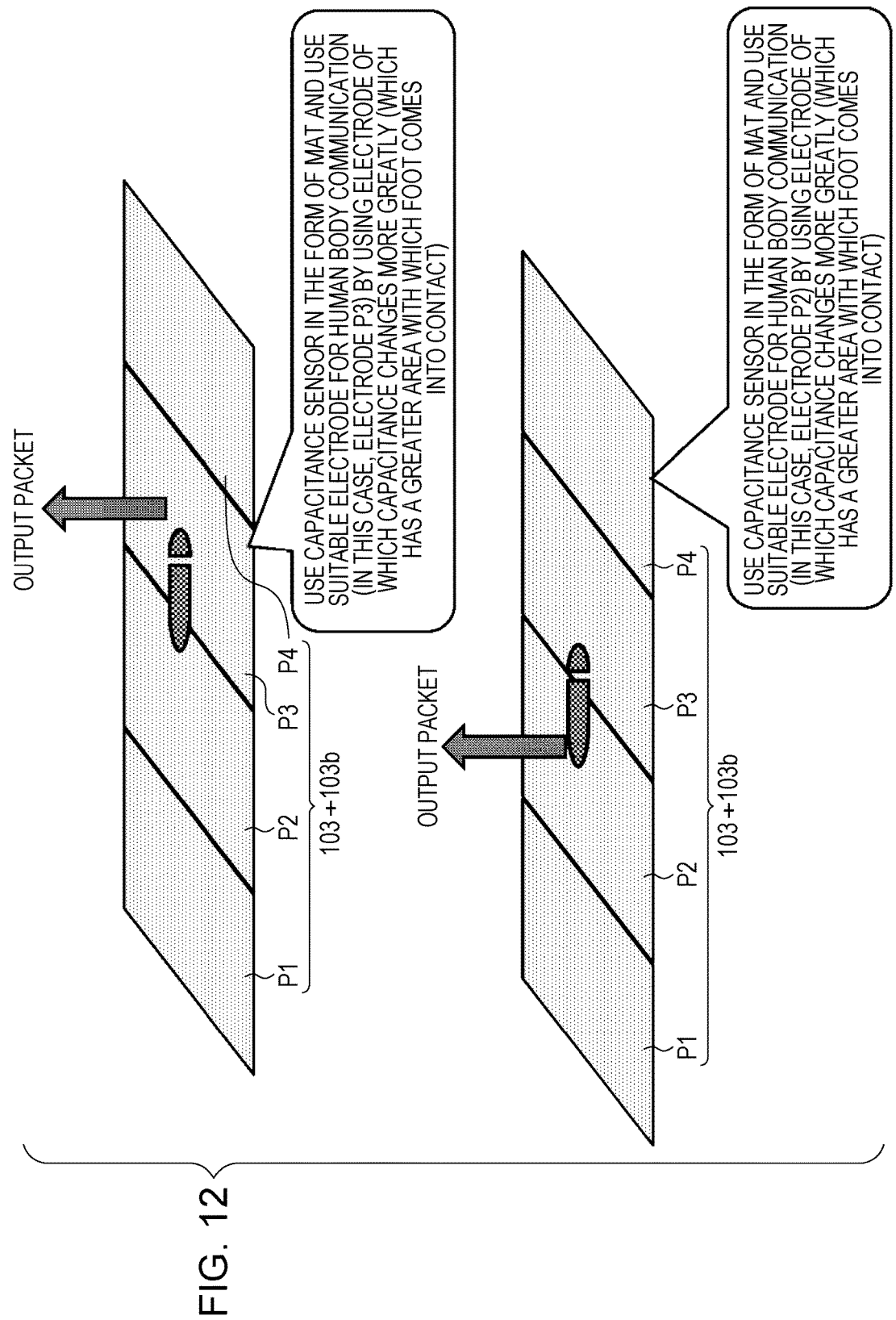
FIG. 12 is a diagram for describing a configuration example in which a human body detection sensor is placed in parallel with a human body communication electrode.

In this manner, in order to determine the electrode that transmits the packet from the multiple electrodes, as illustrated in FIG. 12, a human body detection sensor 103b that detects a change in capacitance is placed in parallel with each of the electrodes P1 to P4 that make up the human body communication electrode group 103.

That is, each of electrodes P1 to P4 has a means of detecting capacitance, and thus, for example, generates an electrical signal according to a contact area of a shoe of the pedestrian and outputs the generated electrical signal to the control unit 120.

The control unit 120 compares electrical signal levels that correspond to the capacitances that are output from the electrodes P1 to P4, respectively, and selects the electrode that outputs the signal that has the highest electric signal level, as the electrode that transmits the packet. In a case where the changes in the capacitance are approximately the same, the human body communication electrode in the direction of proceeding through the gate apparatus may be used.

Moreover, for example, a configuration may be provided in which only the human body detection sensor 103b that detects a change in the capacitance is provided in the human body communication electrode group 103, without the human body detection sensor 102 that is made from an optical sensor being provided. A configuration may be provided in which both the human body detection sensor 102 that is made from optical sensors and the human body detection sensor 103b that detects a change in the capacitance are used.

6-4. Associating of a Pedestrian with the Human Body Communication Terminal by the Gate Apparatus For example, there is a case where the pedestrian runs within the gate apparatus 100 or a case where the electrode that transmits the connection confirmation request packet and the electrode that receives the connection confirmation response packet are different from each other, depending on the situation (an occurrence of a retrial due to a communication error) of the communication with the human body communication terminal 200, and the like.

Figure 13:
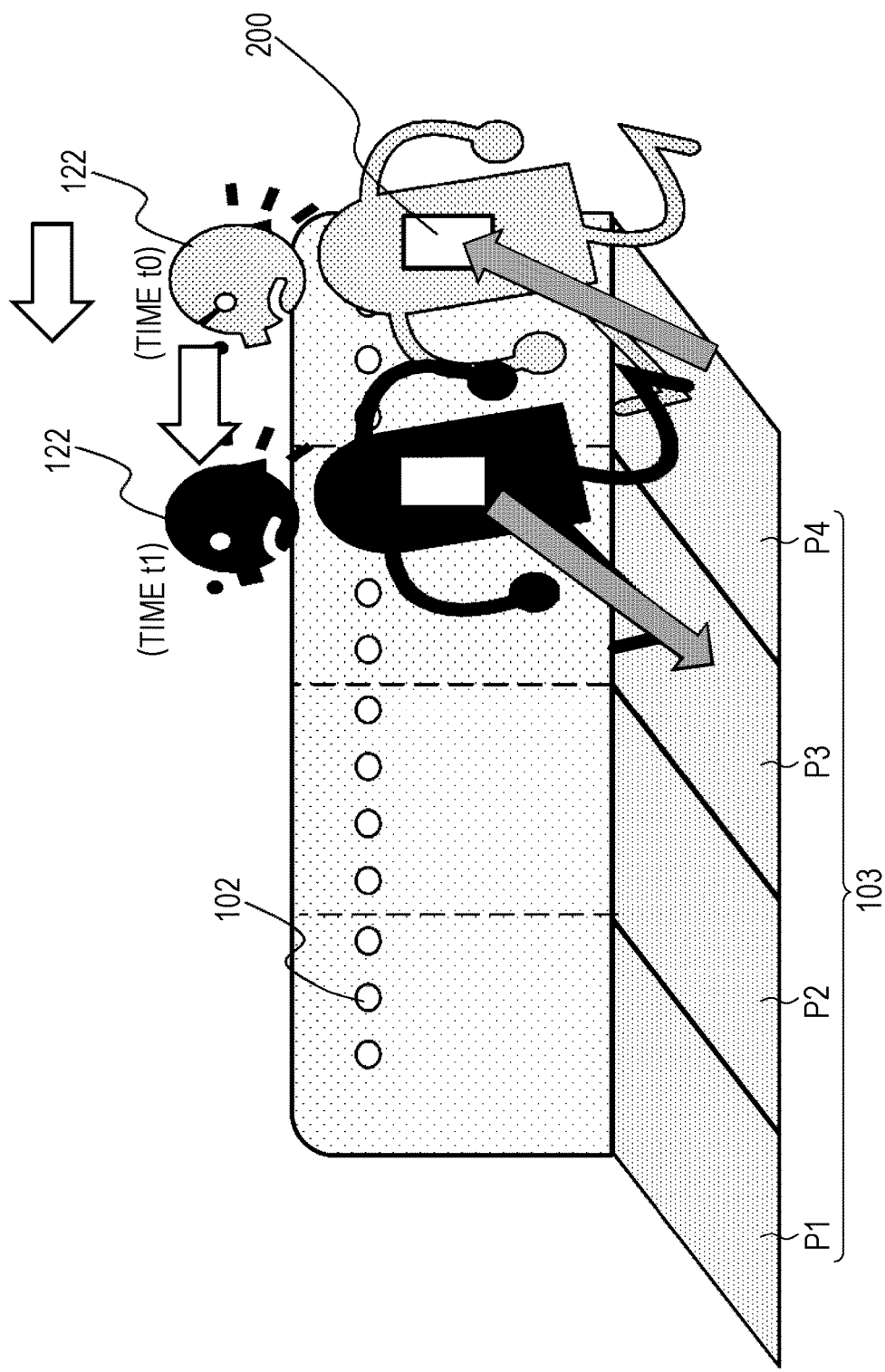

For example, as illustrated in FIG. 13, at a time t0, it is determined that the terminal-carrying pedestrian 122 is on the electrode P4, and the electrode P4 outputs the connection confirmation request packet.

Thereafter, at a time t1, in a case where at a point in time when the human body communication terminal 200 outputs the connection confirmation response packet, the terminal-carrying pedestrian 122 moves forward on the electrode P3, the connection confirmation response packet is received by the electrode P3.

In such a case, when the processing according to the embodiment described above is performed, the electrode that transmits the packet and the electrode that receives the packet do not agree with each other, the terminal-carrying pedestrian 122 is prohibited from passing through the gate apparatus 100. In order to prevent such erroneous processing, processing is performed that sequentially tracks the position of the pedestrian detected within the gate apparatus 100.

For example, in the example illustrated in FIG. 13, at the time t0, when the human body detection sensor 102 detects the terminal-carrying pedestrian 122 at the position of the electrode P4, the control unit 120 generates pedestrian-position information, in which an identifier [a01] of the pedestrian, as a first pedestrian with respect to the gate apparatus 100, and a detection position [S(P4-01)] are associated with each other, and stores the generated positional information in the storage unit 132;

The pedestrian-position information t0: [a01], [S(P4-01)].

The positional information on the pedestrian described above is stored in the storage unit 132.

Moreover, the detection position [S(P4-01)] means that the detection is performed by the first sensor (01) in order from the gate entrance at the position corresponding to the electrode P4. Thereafter, the detection position [S(P4-01)] is sequentially updated as the first pedestrian moves forward. For example, the pedestrian-position information at a time t1 is the following information;

The pedestrian-position information t1: [a01], [SP3-02].

Moreover, the detection position [S(P3-02)] means that the detection is performed by the second sensor (02) at the position corresponding to the electrode P3.

In this manner, in a case where the position of the gate-passing pedestrian is sequentially tracked and the electrode that transmits the connection confirmation request packet and the electrode that receives the connection confirmation response packet are different from each other, the pedestrian-position information on the gate-passing pedestrian is collated. In a case where the result of the collocation is that it is determined that in the electrode position corresponding to the position of the gate-passing pedestrian, the connection confirmation response packet is received, it is determined that confirmation of the connection to the human body communication terminal that the gate-passing pedestrian carries succeeds, and thus the gate opening and closing unit 101 is opened to allow the pedestrian to pass through.

In this manner, the control unit 120 of the gate apparatus 100 stores in the storage unit 132 the pedestrian-position information in which the gate-passing pedestrian and the positional information on the pedestrian are associated with each other. In a case where the output electrode identifier stored in the connection confirmation response packet and the electrode identifier of the electrode that receives the connection confirmation response packet do not agree with each other, referring to the pedestrian-position information in the storage unit 132, the control unit 120 determines whether or not due to the movement of the pedestrian, the two electrode identifiers do not agree with each other. Then, in a case where it is determined that due to the movement of the pedestrian, the two electrode identifiers do not agree with each other, the gate opening and closing unit 101 is opened.

Figure 14:
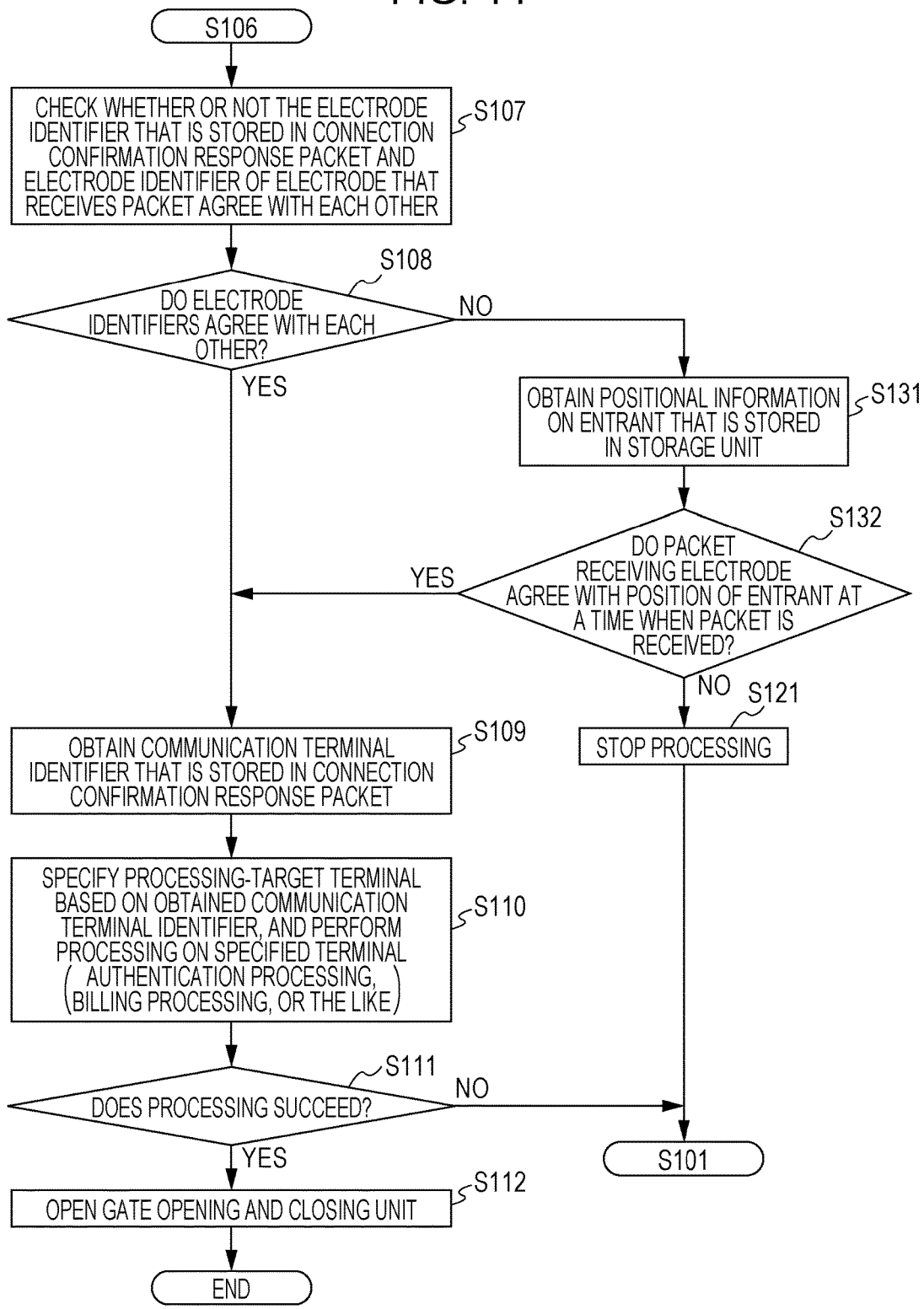

This processing sequence is described referring to FIG. 14. A flow in FIG. 14 is a flow for describing a gate control system in a case where the control unit 120 of the gate apparatus 100 stores the pedestrian-position information on the gate-passing pedestrian in the storage unit and updates the stored positional information.

Processing tasks in step including steps up to Step S107 FIG. 14 that are the same as those in the steps up to and including Step S107 illustrated in the flow in FIG. 10, which is described above, are set to be performed, and processing tasks in Step 108 and subsequent steps are set to be different from those in FIG. 10.

In FIG. 14, only Step S107 and subsequent steps are illustrated. The processing tasks in Step S107 and subsequent steps are described below.

Steps S107 and S108

In Steps S107 and S108, the control unit 120 performs processing that checks whether or not the electrode identifier stored in the connection confirmation response packet and the electrode identifier of the electrode that receives the packet agree with each other.

Moreover, the electrode identifier stored in the connection confirmation response packet is the same identifier as the output electrode identifier that is stored in the connection confirmation request packet that is transmitted from the gate apparatus 100 to the human body communication terminal 200.

That is, processing in each of Steps S107 and S108 is equivalent to processing that determines whether or not the electrode that transmits the connection confirmation request packet from the gate apparatus 100 to the human body communication terminal 200 and the electrode that receives the connection confirmation response packet transmitted from the human body communication terminal 200 to the gate apparatus agree with each other.

In a case where it is determined that the electrode identifier stored in the connection confirmation response packet and the electrode identifier of the electrode that receives the packet agree with each other, the processing proceeds to Step S109. On the other hand, in the case where it is determined that the two electrode identifiers do not agree with each other, the processing proceeds to Step S131.

Step S131

In Step S131, the control unit 120 obtains the pedestrian-position information that is stored in the storage unit 132. The pedestrian-position information is the data that corresponds to the identifier of the pedestrian and the positional information as described above.

Step S132

Next, the control unit 120 determines whether or not the electrode that receives the connection confirmation response packet agrees with a current position of the pedestrian that indicates the pedestrian-position information, which is stored in the storage unit.

That is, with the pedestrian-position information, which is stored in the storage unit, it is determined whether or not the pedestrian at the position of the electrode that receives the connection confirmation response packet is confirmed as the same pedestrian at the position of the electrode that transmits the connection confirmation request packet.

In a case where the confirmation is performed, the processing proceeds to Step S109. On the other hand, in a case where the confirmation is not performed, the processing proceeds to Step S121, stops, and returns to Step S101. In this case, the gate opening and closing unit 101 maintains the closed state without being opened.

Step S109

Processing in Step S109 is performed in a case where any of the following is confirmed. In Step S109, the control unit 120 obtains the communication terminal identifier stored in the connection confirmation response packet received from the human body communication terminal 200, in a case where any one of the following cases occur: a case (a) where it is determined in Step S108 that the electrode identifier stored in the connection confirmation response packet and the identifier of the electrode that receives the packet agree with each other, and a case (b) where in Step S132, with the pedestrian-information stored in the storage unit, a person who carries the human body communication terminal that is a target terminal that has to transmit the connection confirmation request packet is confirmed as the same person who carries the human body communication terminal that transmits the connection confirmation response packet.

The communication terminal identifier is an identifier (ID) of the human body communication terminal, which is output by receiving the connection confirmation request packet from the gate apparatus 100 and generating the connection confirmation response packet.

Steps S110 and S111

Next, in Step S110, the control unit 120 specifies the processing target terminal based on the communication terminal identifier obtained from the connection confirmation response packet, and performs the processing for the specified terminal. For example, the authentication processing, the billing processing, or the like is performed.

In the case where the processing succeeds, the processing proceeds to Step S112. On the other hand, in the case where the processing fails, for example, in the case where there is an error in the authentication processing of the human body communication terminal 200 and thus the validity confirmation of the human body communication terminal 200 is difficult to check, in the case where there is an error in the billing processing, or the like, the processing proceeds to Step S121, stops, and returns to Step S101. In this case, the gate opening and closing unit 101 maintains the closed state without being opened.

Step S112

In Steps S110 to S111, when the authentication processing or the billing processing succeeds based on the communication terminal identifier obtained from the connection confirmation response packet, in Step S112, the control unit 120 opens the gate opening and closing unit 101 to allow the gate-passing pedestrian to pass through.

Moreover, in the case where the connection confirmation processing is completed, the gate apparatus 100 may transmit the packet notifying the connection confirmation completion to the human body communication terminal 200.

In this manner, the pedestrian-position information, which is data corresponding to the identifier of the pedestrian and the positional information, is generated, is stored in the storage unit, and is sequentially updated. Thus, it is possible to track the pedestrian and to prevent erroneous processing.

Moreover, a configuration may be provided in which an approximate moving speed of the pedestrian is measured without generating the pedestrian-position information that is the data corresponding to the identifier of the pedestrian and the positional information, for example, based on the sensor-detected information, and the determination processing is performed according to the moving speed.

That is, in a case where the moving speed of the pedestrian is higher than a predetermined threshold, in a case where the connection confirmation response packet is received at a position that is farther from the entrance than the electrode that transmits the connection confirmation request packet, it is determined that the pedestrian at the position of the electrode that receives the connection confirmation response packet is the same pedestrian as that at the position of the electrode that transmits the connection confirmation request packet.

A configuration may be provided in which this simple processing is performed. That is, the control unit 120 of the gate apparatus 100 estimates the moving speed of the gate-passing pedestrian based on the detection information obtained by the human body detection sensor 102.

In a case where the moving speed is equal to or higher than a threshold value that is prescribed in advance and the electrode that receives the connection confirmation response packet is farther, in a direction of passing through the gate, from the entrance than the electrode position indicating the output electrode identifier wherein the output electrode identifier stored in the connection confirmation response packet and the electrode identifier of the electrode that receives the connection confirmation response packet do not agree with each other, it is determined that due to the movement of the pedestrian, the two electrode identifiers do not agree with each other, and then the processing necessary for the control to open the gate opening and closing unit, such as the authentication processing thereafter is performed.

Figure 15:
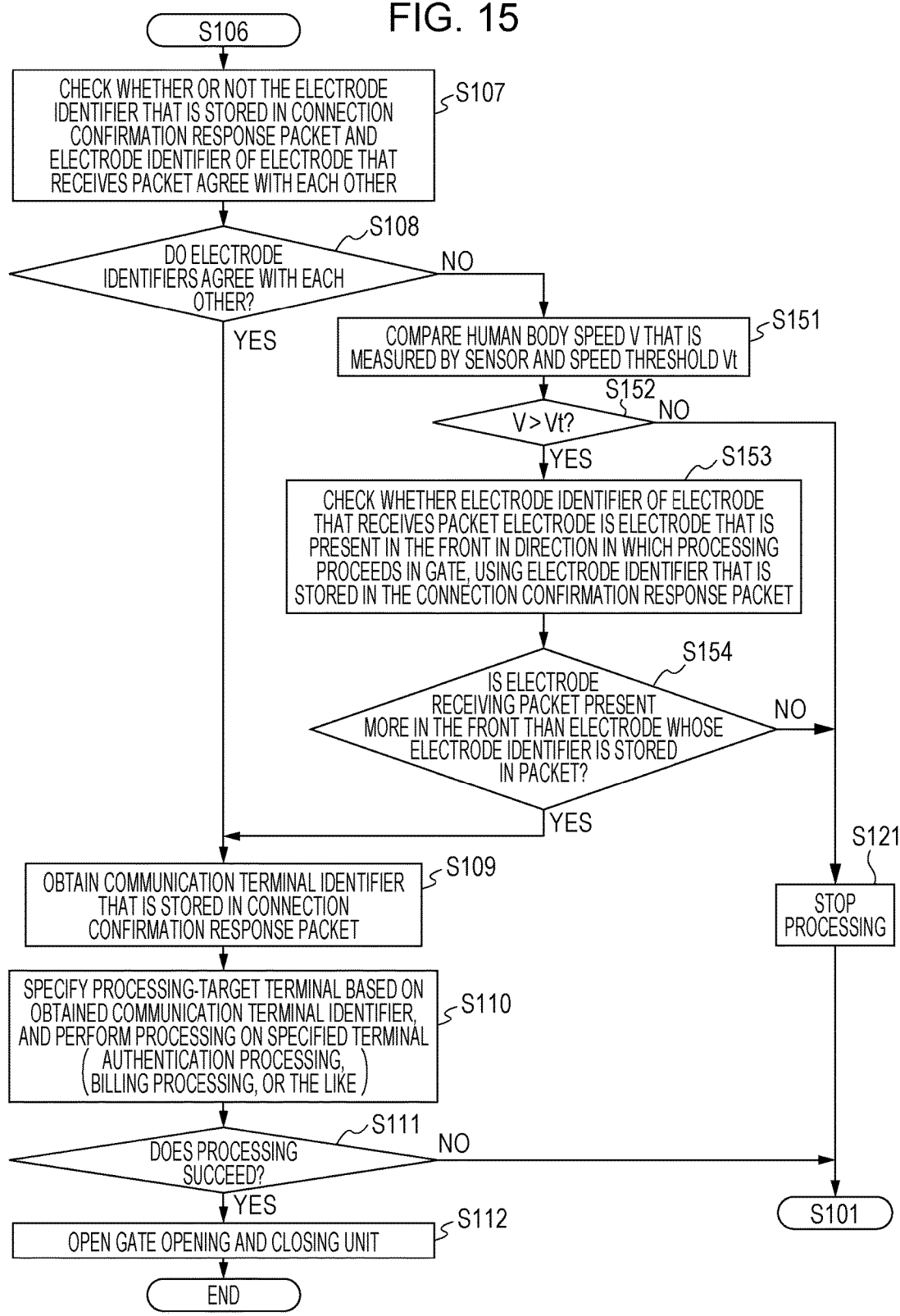

This processing sequence is described referring to the flow illustrated in FIG. 15. The flow illustrated in FIG. 15 is for describing processing that is performed by the control unit 120 of the gate apparatus 100. Processing tasks in steps up to and including Step S107 in FIG. 15 that are the same as those in the steps up to and including Step S107 illustrated in the flow in FIG. 10, which is described above, are set to be performed, and processing tasks in Step 108 and subsequent steps are set to be different from those in FIG. 10.

In FIG. 15, only Step S107 and subsequent steps are illustrated. The processing tasks in Step S107 and subsequent steps are described below.

Steps S107 and S108

In Steps S107 and S108, the control unit 120 performs processing that checks whether or not the electrode identifier stored in the connection confirmation response packet and the electrode identifier of the electrode that receives the packet agree with each other.

Moreover, the electrode identifier stored in the connection confirmation response packet is the same identifier as the output electrode identifier that is stored in the connection confirmation request packet that is transmitted from the gate apparatus 100 to the human body communication terminal 200.

That is, processing in each of Steps S107 and S108 is equivalent to processing that determines whether or not the electrode that transmits the connection confirmation request packet from the gate apparatus 100 to the human body communication terminal 200 and the electrode that receives the connection confirmation response packet transmitted from the human body communication terminal 200 to the gate apparatus agree with each other.

In a case where it is determined that the electrode identifier stored in the connection confirmation response packet and the electrode identifier of the electrode that receives the packet agree with each other, the processing proceeds to Step S109. On the other hand, in the case where it is determined that the two electrode identifiers do not agree with each other, the processing proceeds to Step S151.

Steps Step S151 and S152

In Step S151, the control unit 120 compares a moving speed V of the human body that is calculated according to the detection information obtained by the human body detection sensor 102 with a speed threshold Vt that is prescribed in advance.

In a case where the moving speed V of the human body is higher than the speed threshold Vt that is prescribed in advance, the processing proceeds to Step S153. On the other hand, in a case where the moving speed V of the human body is not higher than the speed threshold Vt that is prescribed in advance, the processing proceeds to Step S121, stops, and returns to Step S101. In this case, the gate opening and closing unit 101 maintains the closed state without being opened.

Step S153 to S154

In Step S153 to S154, the control unit 120 determines whether the electrode identifier of the electrode that receives the packet is farther, in the direction of passing through the gate, from the entrance, than the electrode identifier stored in the connection confirmation response packet.

In a case where the electrode identifier of the electrode that receives the packet is thus, the processing proceeds to Step S109. In a case where the electrode identifier of the electrode that receives the packet is not thus, the processing proceeds to Step S121, stops, and returns to Step S101. In this case, the gate opening and closing unit 101 maintains the closed state without being opened.

Step S109

Processing in Step S109 is performed in a case where any of the following is confirmed. In Step S109, the control unit 120 obtains the communication terminal identifier stored in the connection confirmation response packet received from the human body communication terminal 200, in a case where any one of the following cases occurs: a case (a) where it is determined in Step S108 that the electrode identifier stored in the connection confirmation response packet and the identifier of the electrode that receives the packet agree with each other, and a case (b) where in Steps S151 to S154, the moving speed V of the human body is higher than the speed threshold Vt that is prescribed in advance and it is determined that the electrode identifier of the electrode that receives the packet is farther, in the direction of passing through the gate, from the entrance, than the electrode identifier stored in the connection confirmation response packet.

The communication terminal identifier is an identifier (ID) of the human body communication terminal, which is output by receiving the connection confirmation request packet from the gate apparatus 100 and generating the connection confirmation response packet.

Processing tasks in Step S110 and subsequent steps are the same as those in the flow that is described above referring to FIG. 10 and the same as those in the flow that is described above referring to FIG. 14, and thus, descriptions of the processing tasks in Step S110 and subsequent steps are omitted.

In this manner, in a case where the moving speed of the pedestrian exceeds a predetermined speed, and it is determined that the electrode identifier of the electrode that receives the packet is farther, in the direction of passing through the gate, from the entrance, than the electrode identifier stored in the connection confirmation response packet, even though the electrode that transmits the packet and the electrode that receives the packet do not agree with each other, the processing is performed that determines that the connection to the terminal that the same pedestrian carries is confirmed. By performing this processing, the erroneous processing for the pedestrian who passes through the gate at a high speed can be prevented.

6-5. Process in a Case where the Multiple Pedestrians Pass through a Ticket Gate In a system that uses Near Field Communication (NFC) that is used in examining the ticket and so forth in the related art, the terminal that performs the communication has to be made to be close to a reader/writer provided in the ticket examining machine. Therefore, the processing that examines the ticket of the next pedestrian is difficult to perform before the processing that examines the ticket of a pedestrian who has entered the gate apparatus is completed.

In contrast, in the system that uses the human body communication described above, because the multiple human body communication electrodes are installed, the processing that examines the ticket can be performed at the same time on the multiple pedestrians who enter the gate apparatus. Moreover, the gate is set to have a width such that only one adult person can pass through.

Figure 16:
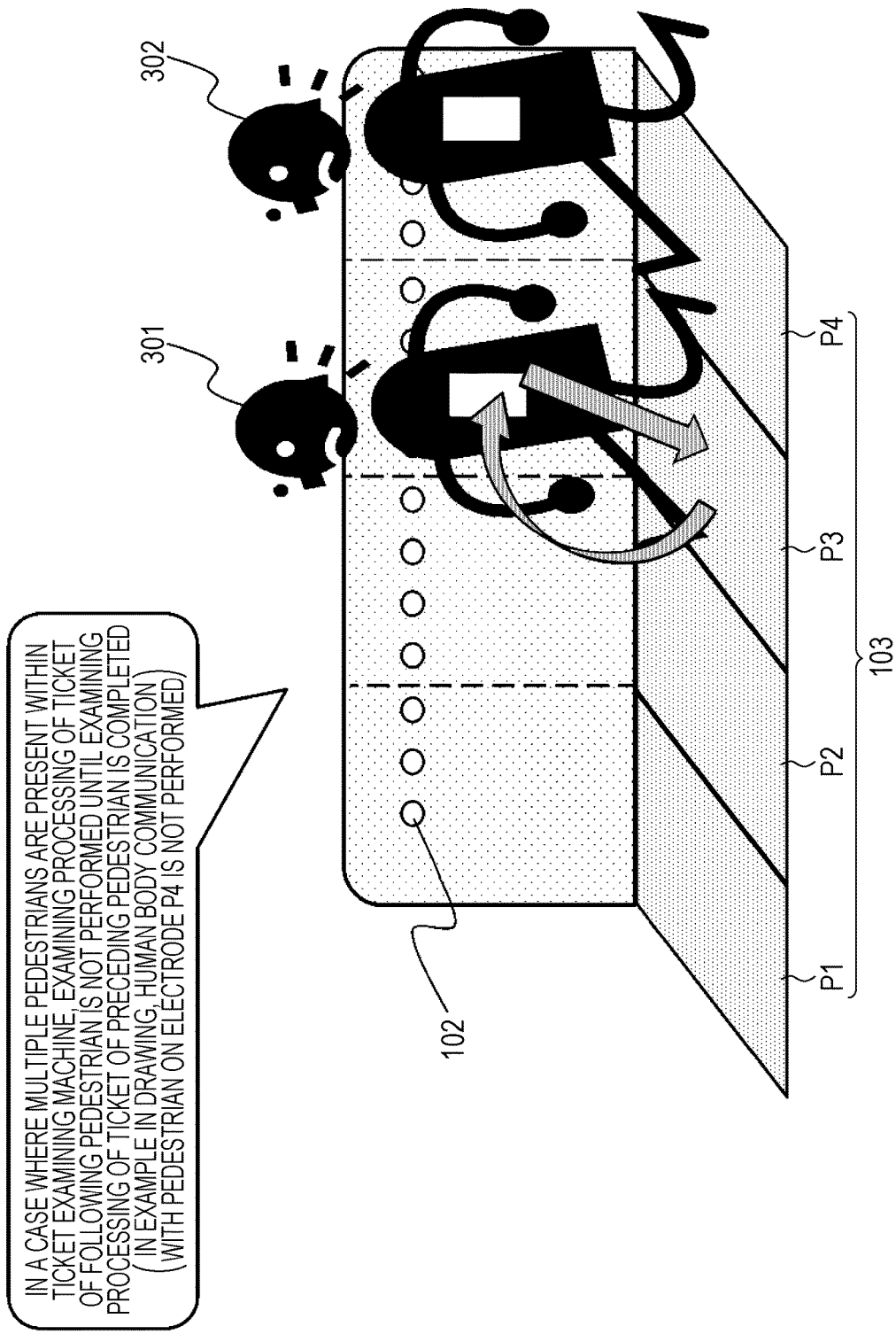
FIG. 16 is a diagram illustrating processing that is performed in a case where the multiple gate-passing pedestrians are present.

FIG. 16 illustrates an example of a case where the multiple pedestrians pass in succession through the gate apparatus for examining the ticket and so forth. The human body detection sensor 102 detects a pedestrian that passes through. Here, a preceding pedestrian 301 and a following pedestrian 302 are detected.

The control unit performs packet transmission that uses the human body communication electrode group 103 (electrodes P1 to P4) which is at the positions that correspond to each detection sensor that detects the pedestrian, and thus performs the processing that checks the connection to the human body communication terminal that each pedestrian carries. The connection confirmation processing tasks using the human body communication are concurrently performed in parallel using the multiple electrodes.

However, at the time of the concurrent processing, when the processing that checks the connection to the communication terminal of the following pedestrian 302 is completed earlier than that for the preceding pedestrian 301 due to a communication error or the like and thus the gate opening and closing unit is opened, there is a likelihood that the preceding pedestrian 301 who has yet to go through the connection confirmation process will unjustly pass through the gate and the following pedestrian 302 will not pass through the gate.

In order to address the problem described above, it is desirable that the ticket examining machine should not perform the human body communication with the next pedestrian to go through the ticket examination until the processing that examines the ticket of the preceding pedestrian within the gate apparatus 100 is completed using the positional information on each pedestrian that can be obtained from the human body detection sensor.

Moreover, processing tasks up to and including processing that checks the connection to the communication terminal that the following pedestrian carries may be performed, but the authentication processing or the billing processing may not be performed.

7. Modification Examples

As described above according to the embodiment, the gate apparatus 100 performs the connection confirmation processing by performing the communication with the human body communication terminal that the person who passes on the human body communication electrode carries.

At the time of the connection confirmation processing, an identifier (ID) specific to a human body communication terminal that the pedestrian carries is obtained, and the validity confirmation, the billing processing, or the like is performed for the communication terminal that is specified based on the obtained ID.

Moreover, in addition to the identifier (ID) specific to the human body communication terminal, an ID specific to a portable communication terminal that operates in cooperation with the human body communication terminal may be transmitted to the gate apparatus, and thus a network may be established between the portable communication terminal and the gate apparatus. As a result, it is possible to perform the processing necessary to examine the ticket, for example, to the billing processing, by performing wireless communication being performed mutually.

Figure 17:
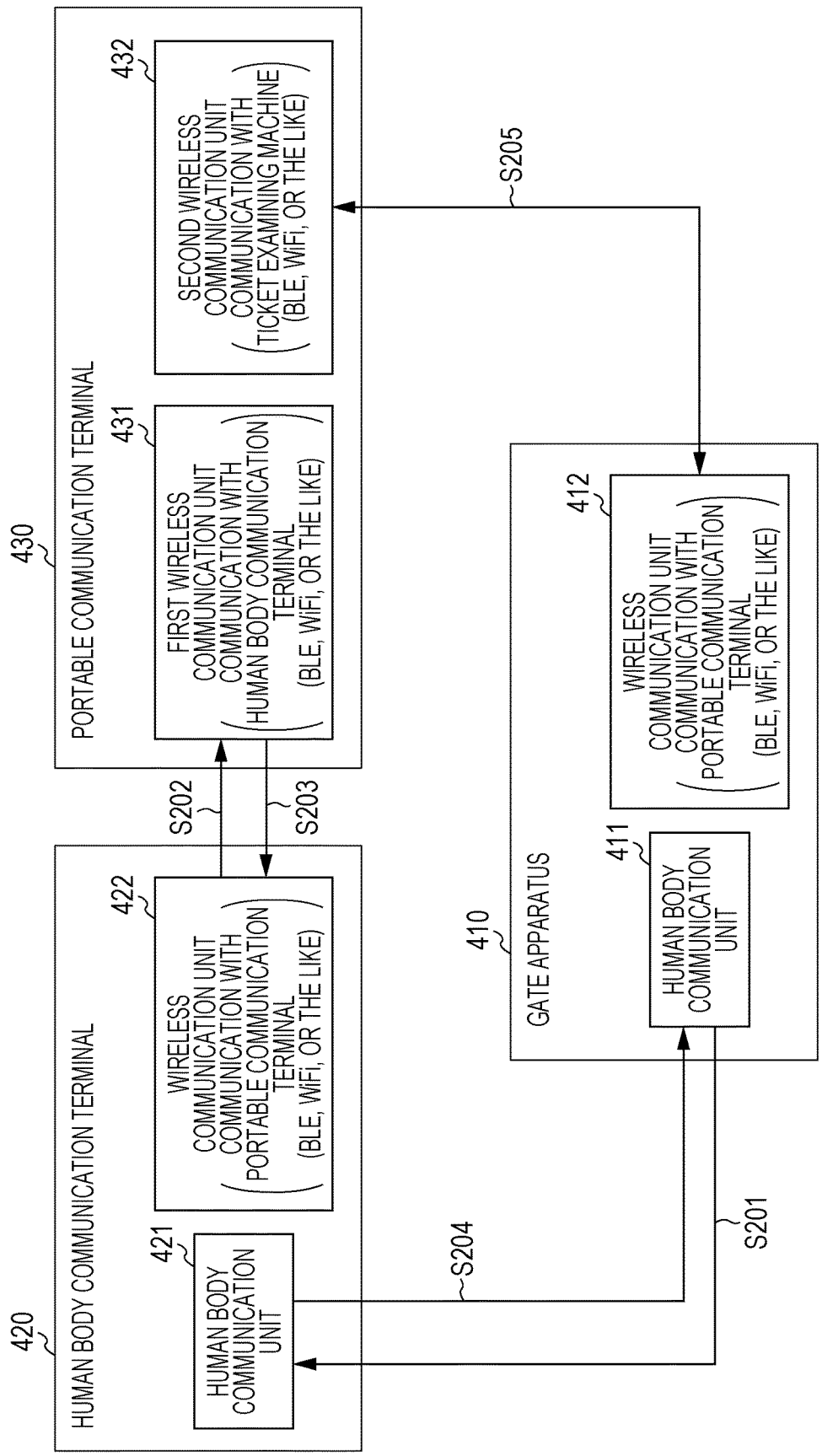
FIG. 17 is a diagram for describing processing that is performed in a case where a portable communication terminal is additionally used.

A gate human body apparatus 410 in a case of performing the processing described above, a human body communication terminal 420 that a pedestrian who passes through a gate apparatus 410 carries, and a configuration example of a communication unit and an example of communication processing in a portable communication terminal 430 are described referring to FIG. 17.

The human body communication terminal 420 has a human body communication unit 421 that performs the human body communication with the gate apparatus 410, and a wireless communication unit 422 that performs the wireless communication with the portable communication terminal 430. Bluetooth communication (BLE), WiFi communication, or the like is performed.

The portable communication terminal 430 has a first wireless communication unit 431 that performs the wireless communication with the human body communication terminal 420 and a second wireless communication unit 432 that performs the wireless communication with the gate apparatus 410.

The gate apparatus 410 has a human body communication unit 411 that performs the communication with the human body communication terminal 420, and a wireless communication unit 412 that performs the wireless communication with the portable communication terminal 430.

A processing sequence that is performed by the three apparatuses is described. Processing is performed in the following order.

Step S201

If the pedestrian steps forward on the human body communication electrode of the gate apparatus 410, the connection confirmation request packet is transmitted from the human body communication unit 411.

Step S202

When receiving the connection confirmation request packet through the human body communication unit 421, the human body communication terminal 420 performs the communication with the first wireless communication unit 431 of the portable communication terminal 430 through the wireless communication unit 422, and makes a request for information (MAC address or the like) necessary to establish communication between the gate apparatus 410 and the portable communication terminal 430.

Step S203

The portable communication terminal 430 transmits the information necessary for the communication to the human body communication terminal 420 in response to a request from the human body communication terminal 420.

Step S204

The human body communication terminal 420 generates the connection confirmation response packet in which the "information necessary to establish the communication between the gate apparatus 410 and the portable communication terminal 430" received from the portable communication terminal 430 is stored, and transmits the generated connection confirmation response packet to the gate apparatus 410 through the human body communication unit 421.

Step S205

The gate apparatus 410 performs the communication with the portable communication terminal 430, using the "information necessary to establish the communication between the gate apparatus 410 and the portable communication terminal 430" received from the human body communication terminal 420, and performs the processing necessary for opening the gate opening and closing unit of the gate apparatus 410, such as the authentication processing, the billing processing, or the like.

By performing the processing, for example, it is possible to perform the processing in cooperation with the portable communication terminal through which the pedestrian can be charged for the ticket.

Moreover, in the processing in each of Steps 202 and S203 among the processing steps described above, it may be possible for the user to perform an operation ahead of time in order to store information necessary for the human body communication terminal in advance. In this case, at the time when the pedestrian passes through the gate apparatus 410, the processing in each of Steps S202 and S203 can be omitted.

In this manner, the configuration of the human body communication terminal can be minimized and thus a corresponding service (balance confirmation or advertisement posting) can be developed by employing a configuration in which the processing is performed in cooperation with portable communication terminals (each having a display or an operation unit, a network connection function and the like) that many people already own.

Figure 18:
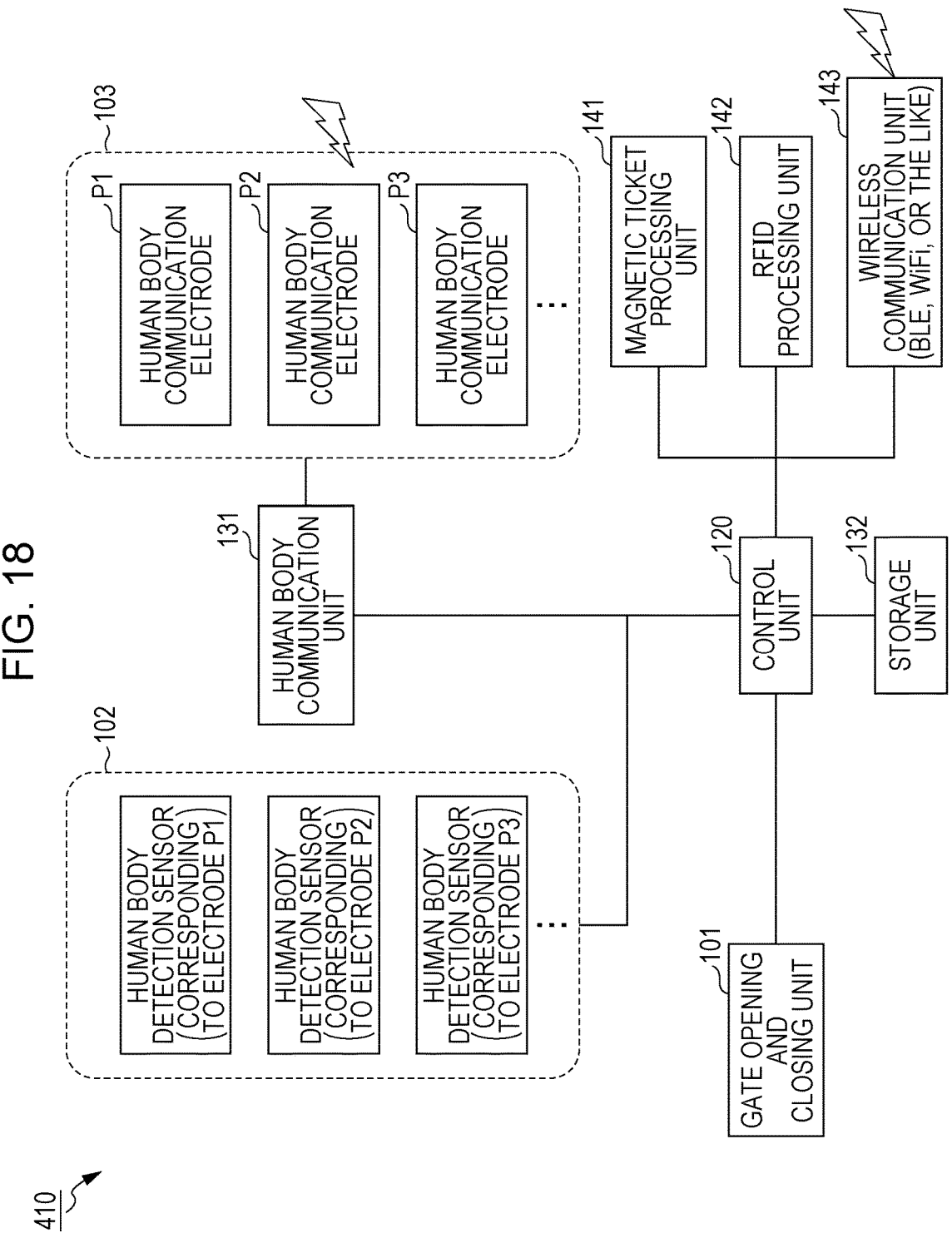
FIG. 18 is a diagram for describing a configuration example of the gate apparatus.
Figure 19:
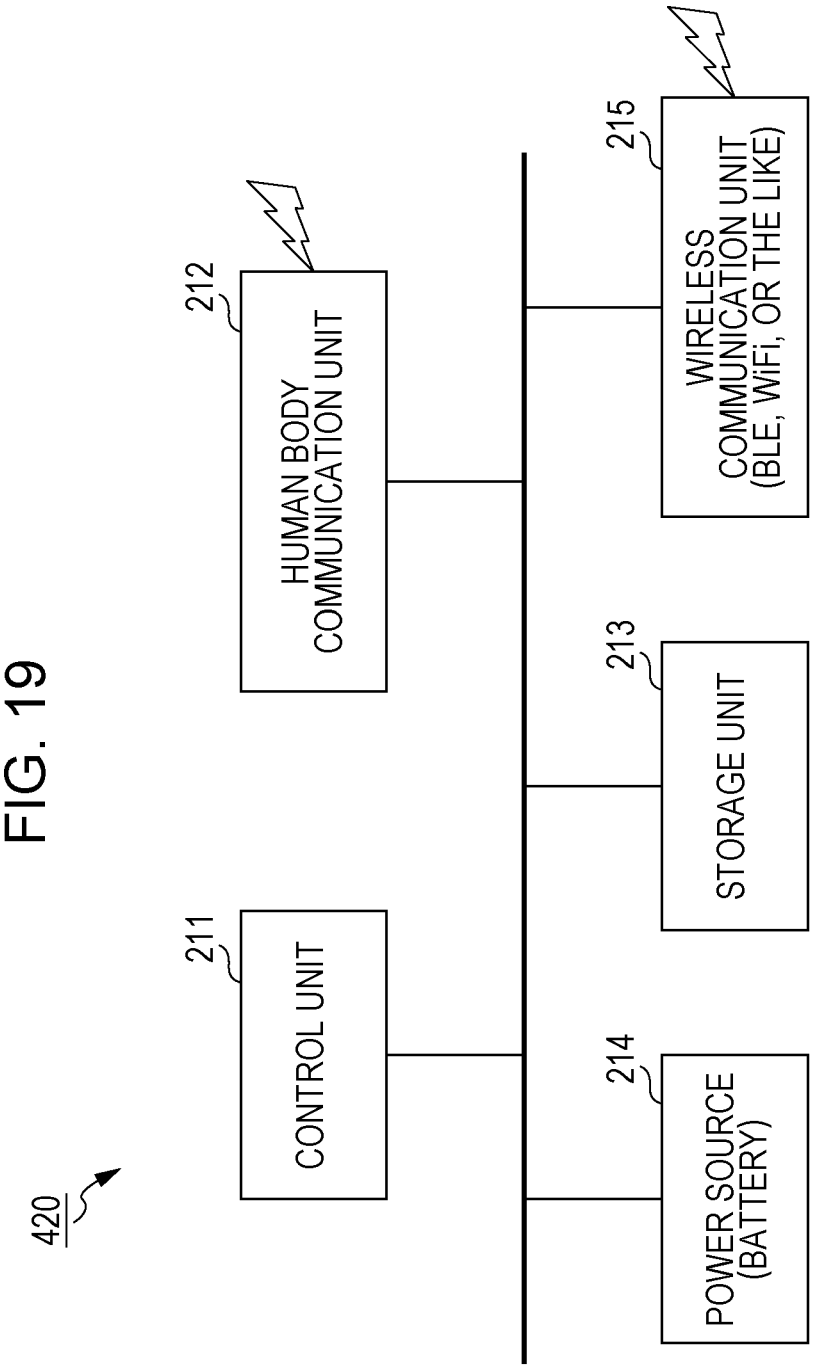
FIG. 19 is a diagram for describing a configuration example of the human body communication terminal.
Figure 20:
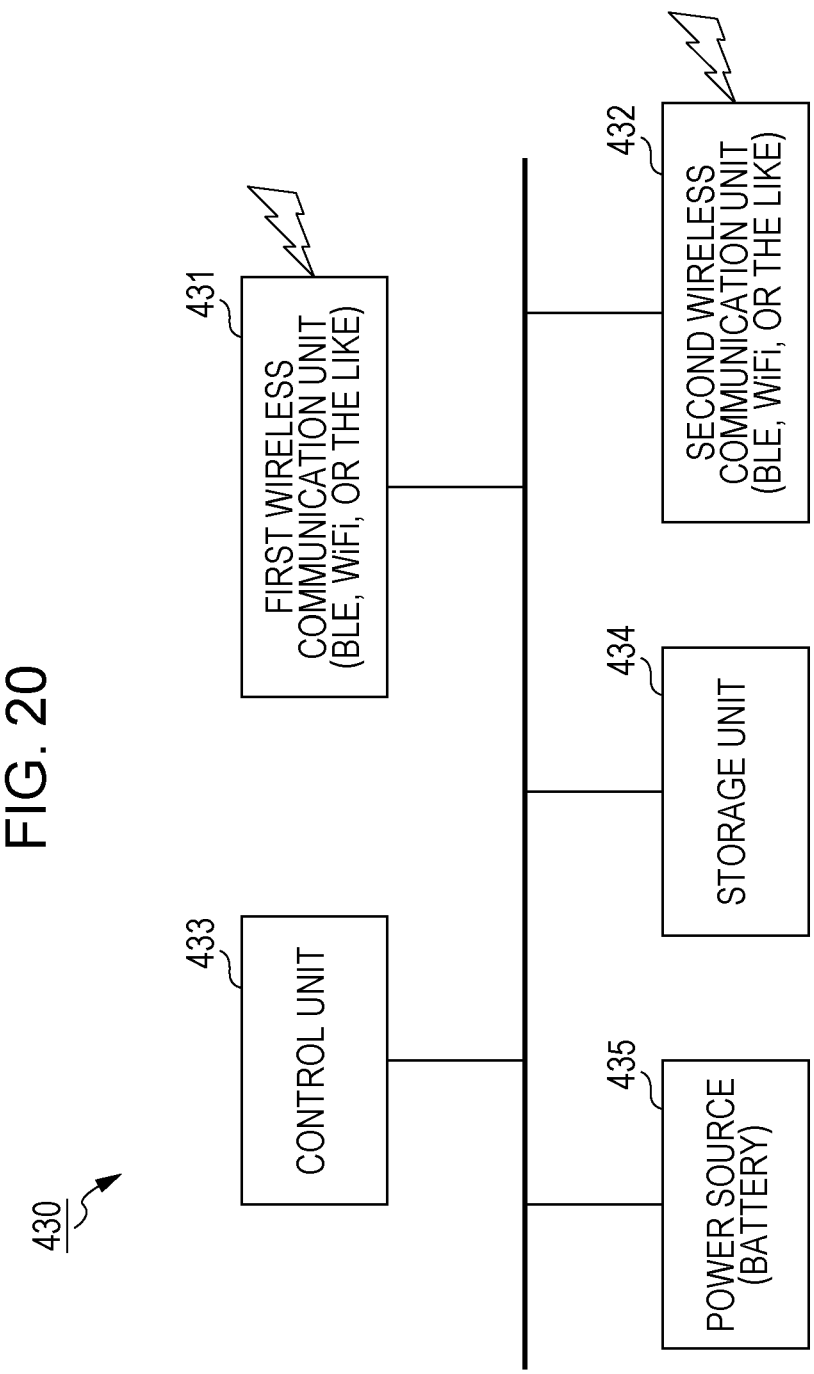
FIG. 20 is a diagram for describing a configuration example of the portable communication terminal.

Examples of configurations of the gate apparatus 410, the human body communication terminal 420, and the portable communication terminal 430 that perform the processing tasks described referring to FIG. 17 are illustrated in FIGS. 18 to 20.

First, the configuration of the gate apparatus 410 is described referring to FIG. 18.

The gate apparatus 410 that is illustrated in FIG. 18 has a configuration that is obtained by adding a wireless communication unit 143 to a configuration of the gate apparatus 100 that is described above referring to FIG. 8. The other configurations are the same as those that are described referring to FIG. 8, and thus descriptions of the other configurations are omitted.

The wireless communication unit 143 performs the wireless communication with the portable communication terminal 430. For example, Bluetooth communication (BLE) or WiFi communication is performed.

A packet that is transmitted through the wireless communication unit 143 is generated by the control unit 120. Furthermore, the packet that is received through the wireless communication unit 143 is analyzed in the control unit 120, and according to a result of the analysis, for example, the billing processing or the like is performed.

FIG. 19 is a block diagram illustrating a configuration example of the human body communication terminal 420.

The configuration of the human body communication terminal 420 is a configuration that is obtained by adding a wireless communication unit 215 to the configuration of the human body communication terminal 200 that is described above referring to FIG. 9. The other configurations are the same as those that are described above referring to FIG. 9, and thus, descriptions of the other configurations are omitted.

The wireless communication unit 215 performs the wireless communication with the portable communication terminal 430. For example, Bluetooth communication (BLE) or WiFi communication is performed.

A packet that is transmitted through the wireless communication unit 215 is generated by the control unit 211. Furthermore, the packet that is received through the wireless communication unit 215 is analyzed in the control unit 211, and according to a result of the analysis, for example, processing that generates the packet to be transmitted to the gate apparatus 410, or the like is performed.

FIG. 20 is a block diagram illustrating a configuration example of the portable communication terminal 430.

The portable communication terminal 430, as illustrated in FIG. 20, includes the first wireless communication unit 431, the second wireless communication unit 432, a control unit 433, a storage unit 434, and a power source (battery) 435.

The control unit 433 performs the generation of the transmission packet with respect to the gate apparatus 410 or the human body communication terminal 420, the analysis of the packet that is received from the gate apparatus 410 or the human body communication terminal 420, and the processing according to a request from the gate apparatus 410 or the human body communication terminal 420, for example, the authentication processing or the billing processing.

The storage unit 434 is configured from a RAM, a ROM, or the like. A program corresponds to the processing that is performed by a control unit 431, an ID of the portable communication terminal, or the like is stored in the storage unit 434. Additionally, the storage unit 434 is used as an area in which the transmission and reception packet data is temporarily stored, or a work area in the processing that is performed by the control unit 431.

The power source (battery) 435 supplies electric power to each unit of the portable communication terminal 430.

The first wireless communication unit 431 and the second wireless communication unit 432 perform the communication with the gate apparatus 410 and the human body communication terminal 420, respectively. For example, Bluetooth communication (BLE) or WiFi communication is performed.

A packet that is transmitted through the first and second wireless communication units 431 and 432 is generated by the control unit 433. Furthermore, the packet that is received through the first and second wireless communication units 431 and 432 is analyzed in the control unit 433, and according to a result of the analysis, for example, processing that generates the packet to be transmitted to the gate apparatus 410 or the human body communication terminal 420, or the like is performed.

8. Summary of Configurations According to the Present Disclosure

The embodiments according to the present disclosure are described in detail above referring to the specific embodiments. However, it is apparent that a person of ordinary skill in the art can accomplish modifications to or substitutes for the embodiments in a range that does not depart from the gist of the present disclosure. That is, simply because the present disclosure is disclosed in the form of embodiments, the present disclosure should not be interpreted in a limited manner. In order to determine the gist of the present disclosure, the scopes of the claims should be considered.

Moreover, the technology disclosed in the present specification can be configured as follows.

(1) A gate apparatus including: a sensor that detects a pedestrian within a gate; multiple human body communication electrodes that are electrodes for performing human body communication and that are separated from one another within the gate; and a control unit that determines a position of the pedestrian according to information on the pedestrian that is detected by the sensor, performs outputting of a connection confirmation request packet through a human body communication electrode corresponding to the determined position, receives a connection confirmation response packet that is transmitted from a human body communication terminal that the pedestrian carries and thus performs analysis processing on the received connection confirmation response packet, and performs opening and closing control of a gate opening and closing unit based on a result of the analysis result, in which the control unit stores in the connection confirmation request packet an output electrode identifier that is an identifier of a communication electrode that performs packet outputting, and determines whether or not the output electrode identifier and an electrode identifier of the electrode that receives the connection confirmation response packet agree with each other.

(2) The gate apparatus according to (1), in which, in a case where it is determined that the output electrode identifier and the electrode identifier of the electrode that receives the connection confirmation response packet agree with each other, the control unit performs authentication processing necessary to open the gate opening and closing unit.

(3) The gate apparatus according to (2), in which a human body communication terminal that receives the connection confirmation request packet stores the output electrode identifier stored in the connection confirmation request packet in the connection confirmation response packet for transmission, and in which the control unit determines whether or not the output electrode identifier stored in the connection confirmation response packet and the electrode identifier of the electrode that receives the connection confirmation response packet, and in a case where it is determined that the two electrode identifiers agree with each other and where the authentication process succeeds, the control unit opens the gate opening and closing unit.

(4) The gate apparatus according to (2) or (3), in which in a case where the multiple electrodes that receive the connection confirmation response packet are present, the control unit selects the electrode that has a high reception level, as a receiving electrode, determines whether or not the electrode identifier of the selected electrode that receives the packet and the output electrode identifier agree with each other, and in which in a case where it is determined that the two electrode identifiers agree with each other, and where the authentication process succeeds, the control unit opens the gate opening and closing unit.

(5) The gate apparatus according to any one of (1) to (4), in which the control unit stores in a storage unit pedestrian-position information in which the pedestrian and positional information on the pedestrian are associated with each other, and in which in a case where the output electrode identifier stored in the connection confirmation response packet and the electrode identifier of the electrode that receives the connection confirmation response packet do not agree with each other, referring to the pedestrian-position information stored in the storage unit, the control unit determines whether or not due to movement of the pedestrian, the two electrode identifiers do not agree with each other.

(6) The gate apparatus according to any one of (1) to (5), in which the control unit estimates a moving speed of the pedestrian, based on the information on the pedestrian that is detected by the sensor, and in which in a case where the moving speed is equal to or higher than a threshold that is prescribed in advance and the electrode that receives the connection confirmation response packet is farther, in a direction of passing through the gate, from an entrance of the gate than an electrode position indicating the output electrode identifier, without the output electrode identifier stored in the connection confirmation response packet and the electrode identifier of the electrode that receives the connection confirmation response packet agreeing with each other, the control unit determines that due to movement of the pedestrian, the two electrode identifiers do not agree with each other.

(7) The gate apparatus according to any one of (1) to (6), in which a human body detection sensor is configured to be placed in parallel with each of the multiple human body communication electrodes, and in which the control unit determines a position of the pedestrian based on the information on the pedestrian that is detected by the human body detection sensor that is placed in parallel with the human body communication electrode, and selects the human body communication electrode corresponding to the determined position of the pedestrian, as the electrode that outputs the connection confirmation request packet.

(8) The gate apparatus according to any one of (1) to (7), further including a wireless communication unit, the gate apparatus performing processing that communicates with a wireless communication terminal by applying information obtained by human body communication with the human body communication terminal, and thus performing processing necessary for passing through the gate apparatus.

(9) A communication apparatus including: a human body communication unit that performs communication through a human body; and a control unit that performs generation of a packet that is transmitted through the human body communication unit and performs analysis of the packet that is received through human body communication unit, in which the control unit obtains an output electrode identifier that is an identifier stored in a connection confirmation request packet that is received from a gate apparatus, and that indicates the electrode that outputs the connection confirmation request packet, and generates a connection confirmation request packet in which the obtained output electrode identifier and a terminal identifier that is an identifier of the communication apparatus itself are stored, and outputs the generated connection confirmation response packet through the human body communication unit.

(10) The communication apparatus according to (9), further including a wireless communication unit that performs wireless communication with a portable communication terminal, in which the control unit stores communication information necessary for communication with the portable communication terminal in the connection confirmation response packet, and transmits the stored communication information to the gate apparatus.

(11) A communication system including: a gate apparatus; and a human body communication terminal, in which the gate apparatus includes: a sensor that detects a pedestrian within a gate; multiple human body communication electrodes that are electrodes for performing human body communication and that are separated from one another within the gate; and a gate-apparatus control unit that determines a position of the pedestrian according to information on the pedestrian that is detected by the sensor, performs outputting of a connection confirmation request packet through a human body communication electrode corresponding to the determined position, receives a connection confirmation response packet that is transmitted from a human body communication terminal that the pedestrian carries and thus performs analysis processing on the received connection confirmation response packet, and performs opening and closing control of a gate opening and closing unit based on a result of the analysis result, in which the gate-apparatus control unit is configured to store in the connection confirmation request packet an output electrode identifier that is an identifier of a communication electrode that performs packet outputting, and to determine whether or not the output electrode identifier and an electrode identifier of the electrode that receives the connection confirmation response packet agree with each other, and in which the human body communication terminal includes: a human body communication unit that performs communication through a human body; and a terminal control unit that performs generation of a packet that is transmitted through the human body communication unit and performs analysis of the packet that is received through human body communication unit, and in which the terminal control unit obtains the output electrode identifier stored in a connection confirmation request packet that is received from the gate apparatus, generates a connection confirmation response packet in which the obtained output electrode identifier and a terminal identifier that is an identifier of the communication apparatus itself are stored, and outputs the generated connection confirmation response packet through the human body communication unit to the gate apparatus.

(12) A gate control method that is performed in a gate apparatus that includes a sensor that detects a pedestrian within a gate and multiple human body communication electrodes that are electrodes for performing human body communication and that are separated from one another within the gate, the method causing a control unit to perform; determining a position of the pedestrian according to information on the pedestrian that is detected by the sensor; determining a human body communication electrode corresponding to the determined position, as the electrode that outputs a packet; generating a connection confirmation request packet in which an output electrode identifier that is an identifier of the determined electrode that outputs the packet and outputting the generated connection confirmation request packet from the determined electrode that outputs the packet is stored; and receiving a connection confirmation response packet that is transmitted from a human body communication terminal that a gate-passing pedestrian carries and determining whether or not an electrode identifier of the electrode that outputs the packet and an electrode identifier of the electrode that receives the connection confirmation response packet agree with each other.

(13) A program for causing gate control processing in a gate apparatus that includes a sensor that detects a pedestrian within a gate and multiple human body communication electrodes that are electrodes for performing human body communication and that are separated from one another within the gate, the program causing a control unit to perform; determining a position of the pedestrian according to information on the pedestrian that is detected by the sensor; determining a human body communication electrode corresponding to the determined position, as the electrode that outputs a packet; generating a connection confirmation request packet in which an output electrode identifier that is an identifier of the determined electrode that outputs the packet and outputting the generated connection confirmation request packet from the determined electrode that outputs the packet is stored; and receiving a connection confirmation response packet that is transmitted from a human body communication terminal that a gate-passing pedestrian carries and determining whether or not an electrode identifier of the electrode that outputs the packet and an electrode identifier of the electrode that receives the connection confirmation response packet agree with each other.

Furthermore, it is possible to execute a sequence of the processing described throughout the specification in hardware, software, or a combination of hardware and software configurations. In a case where the processing is executed in software, it is possible to install a program in which the processing sequence is recorded, on a memory within a computer that is integrated into dedicated hardware and thus execute the program, or to install the program on an all-purpose computer that is capable of executing a variety of processing and thus executing the program. For example, the program can be recorded in advance on a recording medium. In addition to being installed on the computer from the recording medium, the program can be received over a network, such as a local area network (LAN) and the Internet, and be installed on the recording medium such as a built-in hard disk.

Moreover, various processing tasks described in the specification may be executed not only in time series according to the description, but may be also executed in parallel or individually according to processing capability of an apparatus that executes the processing or whenever necessary. Furthermore, the system in the present specification is configured to be a logical combination of multiple apparatuses, and the apparatuses in each configuration are not limited to being within the same housing.

It should be understood by those skilled in the art that various modifications, combinations, sub-combinations and alterations may occur depending on design requirements and other factors insofar as they are within the scope of the appended claims or the equivalents thereof.

What is claimed is:
1. A gate apparatus, comprising:
a sensor configured to detect a pedestrian within a gate;
multiple electrodes configured to communicate via human body communication, and separated from one another within the gate; and
circuitry configured to:
determine a position of the pedestrian based on information on the pedestrian that is detected by the sensor;
store, in a connection confirmation request packet, an output electrode identifier that is an identifier of a first electrode among the multiple electrodes configured to output the connection confirmation request packet;
output the connection confirmation request packet with the output electrode identifier, via the first electrode among the multiple electrodes that corresponds to the determined position;
receive a connection confirmation response packet that is transmitted from a human body communication terminal that the pedestrian carries, and analyze the received connection confirmation response packet,
wherein the connection confirmation response packet is received by a second electrode among the multiple electrodes; and
control operation of the gate based on the analysis of the connection confirmation response packet and a determination that the output electrode identifier, that corresponds to the first electrode, agrees with a first electrode identifier of the second electrode and the first electrode identifier agrees with the output electrode identifier.

2. The gate apparatus according to claim 1, wherein, based on the determination, the circuitry is further configured to initiate an authentication process to open the gate.

3. The gate apparatus according to claim 2,
wherein the human body communication terminal that receives the connection confirmation request packet is configured to store the output electrode identifier in the connection confirmation response packet for transmission, and
wherein the circuitry is further configured to
open the gate based on the stored output electrode identifier which agrees with the first electrode identifier, the first electrode identifier which agrees with the stored output electrode identifier, and success of the authentication process.

4. The gate apparatus according to claim 2,
wherein based on a reception of the connection confirmation response packet by the multiple electrodes, the circuitry is further configured to:
select a third electrode among the multiple electrodes with a reception level higher than a threshold, as a receiving electrode, and
open the gate based on a second electrode identifier of the selected third electrode which agrees with the output electrode identifier, the output electrode identifier which agrees with the second electrode identifier of the selected third electrode, and success of the authentication process.

5. The gate apparatus according to claim 1,
wherein the circuitry is further configured to:
store, in a memory, pedestrian-position information in which the pedestrian and positional information on the pedestrian are associated, and
wherein based on the output electrode identifier stored in the connection confirmation response packet which disagrees with the first electrode identifier of the second electrode that receives the connection confirmation response packet and the first electrode identifier which disagrees with the output electrode identifier, refer to the pedestrian-position information stored in the memory to determine whether due to movement of the pedestrian, the output electrode identifier and the first electrode identifier disagree with each other.

6. The gate apparatus according to claim 1,
wherein the circuitry is further configured to:
estimate a moving speed of the pedestrian, based on the information on the pedestrian that is detected by the sensor, and
determine that the output electrode identifier and the first electrode identifier disagree with each other due to movement of the pedestrian based on the moving speed which is equal to or higher than a threshold and the second electrode that receives the connection confirmation response packet is farther, in a direction that approaches the gate, from an entrance of the gate than an electrode position that indicates the output electrode identifier.

7. The gate apparatus according to claim 1,
wherein a human body detection sensor is configured to be placed in parallel with each of the multiple electrodes, and
wherein the circuitry is further configured to determine the position of the pedestrian based on the information on the pedestrian that is detected by the sensor that is placed in parallel with a third electrode among the multiple electrodes, and
select the third electrode that corresponds to the determined position of the pedestrian to output the connection confirmation request packet.

8. The gate apparatus according to claim 1, further comprising:
a wireless transceiver,
wherein the gate apparatus is configured to communicate with a wireless communication terminal which uses information obtained by human body communication from the human body communication terminal, and execute a process to pass through the gate apparatus.

9. A communication apparatus, comprising:
a first circuitry configured to communicate via a human body; and
a second circuitry configured to:
generate a packet that is transmitted via the first circuitry;
analyze the packet that is received via the first circuitry;
obtain an output electrode identifier that is an identifier stored in a connection confirmation request packet that is received from a gate apparatus, and that indicates an electrode that outputs the connection confirmation request packet;
generate a connection confirmation response packet in which the obtained output electrode identifier and a terminal identifier that is an identifier of the communication apparatus are stored; and
output the generated connection confirmation response packet via the first circuitry.

10. The communication apparatus according to claim 9, further comprising:
a wireless transceiver configured to communicate with a portable communication terminal,
wherein the second circuitry is further configured to store communication information for communication with the portable communication terminal in the connection confirmation response packet, and transmit the stored communication information to the gate apparatus.

11. A communication system, comprising:
a gate apparatus; and
a human body communication terminal,
wherein the gate apparatus includes:
a sensor configured to detect a pedestrian within a gate;
multiple electrodes configured to communicate via human body communication and separated from one another within the gate; and
first circuitry configured to:
determine a position of the pedestrian based on information on the pedestrian that is detected by the sensor;
store, in a connection confirmation request packet, an output electrode identifier that is an identifier of a first electrode among the multiple electrodes configured to output the connection confirmation request packet;
output the connection confirmation request packet with the output electrode identifier, via the first electrode among the multiple electrodes that corresponds to the determined position;
receive a connection confirmation response packet that is transmitted from a human body communication terminal that the pedestrian carries, and analyze the received connection confirmation response packet,
wherein the connection confirmation response packet is received by a second electrode among the multiple electrodes;

control operation of the gate based on the analysis of the connection confirmation response packet and a determination that the output electrode identifier, that corresponds to the first electrode, agrees with a first electrode identifier of the second electrode and the first electrode identifier agrees with the output electrode identifier, and wherein the human body communication terminal includes:
- a human body communication unit configured to communicate via a human body, and
- second circuitry configured to:
  - generate a packet that is transmitted via the human body communication unit;
  - analyze the packet that is received via the human body communication unit;
  - obtain the output electrode identifier stored in a connection confirmation request packet that is received from the gate apparatus;
  - generate a connection confirmation response packet in which the obtained output electrode identifier and a terminal identifier that is an identifier of the human body communication terminal are stored; and
  - output the generated connection confirmation response packet via the human body communication unit to the gate apparatus.

12. A gate control method, comprising:

in a gate apparatus that includes a sensor configured to detect a pedestrian within a gate, and multiple electrodes configured to communicate using human body communication and separated from one another within the gate:

determining a position of the pedestrian based on information on the pedestrian that is detected by the sensor;

determining a first electrode among the multiple electrodes corresponding to the determined position, wherein the first electrode is configured to output a connection confirmation request packet;

generating the connection confirmation request packet in which an output electrode identifier, that is an identifier of the determined first electrode, is stored;

outputting the generated connection confirmation request packet from the determined first electrode;

receiving and analyzing a connection confirmation response packet that is transmitted from a human body communication terminal that a gate-passing pedestrian carries, wherein the connection confirmation response packet is received by a second electrode among the multiple electrodes; and controlling operation of the gate based on the analysis of the connection confirmation response packet and a determination that the output electrode identifier, that corresponds to the first electrode, agrees with a first electrode identifier of the second electrode and the first electrode identifier agrees with the output electrode identifier.

13. A non-transitory computer-readable medium having stored thereon, computer-executable instructions which when executed by a computer, cause the computer to execute operations, the operations comprising:

in a gate apparatus that includes a sensor configured to detect a pedestrian within a gate, and multiple electrodes configured to communicate through the human body communication and separated from one another within the gate:

determining a position of the pedestrian based on information on the pedestrian that is detected by the sensor;

determining a first electrode among the multiple electrodes corresponding to the determined position, wherein the first electrode is configured to output a connection confirmation request packet;

generating the connection confirmation request packet in which an output electrode identifier, that is an identifier of the determined first electrode, is stored;

outputting the generated connection confirmation request packet from the determined first electrode;

receiving and analyzing a connection confirmation response packet that is transmitted from a human body communication terminal that a gate-passing pedestrian carries, wherein the connection confirmation response packet is received by a second electrode among the multiple electrodes; and controlling operation of the gate based on the analysis of the connection confirmation response packet and a determination that the output electrode identifier, that corresponds to the first electrode, agrees with a first electrode identifier of the second electrode and the first electrode identifier agrees with the output electrode identifier.

14. The gate apparatus according to claim 1, wherein the first electrode and the second electrode are same electrode among the multiple electrodes.

* * * * *